(12) United States Patent
Nakada

(10) Patent No.: US 10,955,821 B2
(45) Date of Patent: Mar. 23, 2021

(54) PLANT CONTROL SYSTEM

(71) Applicant: TOYOTA JIDOSHA KABUSHIKI KAISHA, Toyota (JP)

(72) Inventor: Hayato Nakada, Minamitsuru-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 125 days.

(21) Appl. No.: 16/227,615

(22) Filed: Dec. 20, 2018

(65) Prior Publication Data

US 2019/0212718 A1     Jul. 11, 2019

(30) Foreign Application Priority Data

Jan. 10, 2018 (JP) .............................. JP2018-002058

(51) Int. Cl.
| | |
|---|---|
| *G05B 19/4155* | (2006.01) |
| *F02D 41/00* | (2006.01) |
| *G05B 13/04* | (2006.01) |
| *F02D 41/14* | (2006.01) |
| *F02D 43/00* | (2006.01) |

(52) U.S. Cl.
CPC ..... *G05B 19/4155* (2013.01); *F02D 41/0007* (2013.01); *F02D 41/0047* (2013.01); *F02D 41/1406* (2013.01); *F02D 43/00* (2013.01); *G05B 13/042* (2013.01); *F02D 2041/141* (2013.01); *F02D 2041/1419* (2013.01); *G05B 2219/32297* (2013.01)

(58) Field of Classification Search
CPC .................... G05B 19/4155; F02D 41/1406
See application file for complete search history.

(56) References Cited

U.S. PATENT DOCUMENTS

| | | |
|---|---|---|
| 2004/0148144 A1 | 7/2004 | Martin |
| 2017/0260920 A1 | 9/2017 | Nakada |

FOREIGN PATENT DOCUMENTS

| | | | |
|---|---|---|---|
| JP | 2014-127083 A | 7/2014 | |
| JP | 2016-061188 | 4/2016 | |
| JP | 2016-169688 A | 9/2016 | |
| JP | 2017-101627 | 6/2017 | |
| JP | 2017-101627 A | 6/2017 | |
| JP | 2018-63586 | * 4/2019 | ............. G05B 13/04 |

* cited by examiner

*Primary Examiner* — Nathan L Laughlin
(74) *Attorney, Agent, or Firm* — Finnegan, Henderson, Farabow, Garrett & Dunner, LLP

(57) ABSTRACT

A plant control system comprises a feedback controller 5 configured to determine a control input of a plant 6 so that one control output of the plant approaches a target value, a provisional target value calculating part 2 configured to calculate a provisional target value based on a predetermined parameter of the plant, and a reference governor 3 configured to perform a minimum value search of an object function by updating a corrected target value to thereby derive the target value from the provisional target value. The reference governor is configured to update the corrected target value only between $r-0.5R_r$ and "r". $R_r$ is a value of a partial differential for the corrected target value "w" of the object function when the corrected target value "w" is the provisional target value "r".

10 Claims, 26 Drawing Sheets

PLANT CONTROL SYSTEM

FIELD

The present invention relates to a plant control system.

BACKGROUND

In a plant which is a controlled object, feedback control is performed so that a control output approaches a target value. However, in actual control, due to hardware or control constraints, there are often constraints on the value of the control output. If designing a control system ignoring such constraints, the transitional response is liable to deteriorate and control is liable to become unstable.

As a technique for improving the satisfaction of constraints, a "reference governor" is known (for example, PTLs 1 and 2). A reference governor considers the satisfaction of constraints and corrects a provisional target value calculated based on predetermined parameters of the plant to derive a target value of the control output. Specifically, the reference governor performs a minimum value search of a predetermined object function to thereby calculate the target value.

PTL 1 describes correcting provisional target values of a supercharging pressure and EGR rate in a diesel engine by a reference governor. Specifically, the gradient method is used to update the corrected target values so that value of the object function becomes smaller and thereby the provisional target values are corrected.

CITATION LIST

Patent Literature

[PTL 1] Japanese Unexamined Patent Publication No. 2017-101627
[PTL 2] Japanese Unexamined Patent Publication No. 2016-061188

SUMMARY

Technical Problem

However, with a minimum value search of an object function by the gradient method, the range of the search consists of all real numbers, so an inefficient search is performed. As a result, the processing load of the reference governor becomes higher.

Further, if there is one parameter for which a target value is set (for example, either of the supercharging pressure or EGR rate), the object function J(w) becomes a downward protruding function such as shown in FIG. 26. With the gradient method, at the time of updating the corrected target value "w", the corrected target value "w" is moved by exactly the calculated amount of the slant of the object function J(w) multiplied with a predetermined constant.

However, setting a suitable constant in accordance with the control model is difficult. If the constant is large, as shown in FIG. 26, each time updating the corrected target value "w", the direction of movement of the corrected target value "w" changes. For this reason, the number of times of updating the corrected target value "w" necessary for making the corrected target value "w" approach the optimum target value $w_{op}$ becomes greater and the processing load of the reference governor becomes higher. On the other hand, if the constant is small, as shown in FIG. 27, the amount of movement of the corrected target value "w" when the corrected target value "w" is updated is small. For this reason, the number of times of updating the corrected target value "w" necessary for making the corrected target value "w" approach the optimum target value $w_{op}$ becomes greater and the processing load of the reference governor becomes higher.

Therefore, in consideration of the above problem, an object of the present invention is to reduce the processing load of a reference governor when the reference governor performs a minimum value search of the object function.

Solution to Problem

The summary of the present disclosure is as follows.

(1) A plant control system comprising: a feedback controller configured to determine a control input of a plant so that one control output of the plant approaches a target value; a provisional target value calculating part configured to calculate a provisional target value based on a predetermined parameter of the plant; and a reference governor configured to perform a minimum value search of an object function by updating a corrected target value to thereby derive the target value from the provisional target value, wherein the object function is defined by the following formula (1) or formula (2)

[Mathematical Equation 1]

$$J(w) = (r-w)^2 + \rho \sum_{k=1}^{N} \max\{y_k - y_{up}, 0\} \quad (1)$$

[Mathematical Equation 2]

$$J(w) = (r-w)^2 + \rho \sum_{k=1}^{N} \max\{y_{low} - y_k, 0\} \quad (2)$$

where "r" is the provisional target value, "w" is the corrected target value, p is a weighting coefficient, "k" is a time step, $y_k$ is a future predicted value of the control output at the time step k, $y_{up}$ is an upper limit value of the control output, $y_{low}$ is a lower limit value of the control output, and N is a number of prediction steps, and the reference governor is configured to calculate the future predicted value of the control output by the following formula (3)

$$y_{k+1} = Ay_k + Bw \quad (3),$$

where A and B are predetermined constants, and the reference governor is configured to update the corrected target value only between $r-0.5R_r$ and "r", where $R_r$ is a value of a partial differential for the corrected target value "w" of the object function when the corrected target value "w" is the provisional target value "r".

(2) The plant control system described in above (1), wherein the reference governor is configured to update the corrected target value by a binary search method.

(3) The plant control system described in above (1), wherein the reference governor is configured to set an initial value $w_0$ of the corrected target value to $r-0.5R_r$.

(4) The plant control system described in above (3), wherein if a value $R_{w0}$ of the partial differential when the corrected target value "w" is the initial value $w_0$ is negative, the reference governor is configured to calculate an i-th corrected target value $w_i$ by the following formula (4)

$$w_i = (R_{wi-1}r - R_r w_{i-1})/(R_{wi-1} - R_r) \quad (4)$$

where $R_{wi-1}$ is a value of the partial differential when the corrected target value "w" is an i−1th corrected target value $w_{i-1}$ and "i" is an integer of 1 or more.

(5) The plant control system described in above (3), wherein if a value $R_{w0}$ of the partial differential when the corrected target value "w" is the initial value $w_0$ is positive, the reference governor is configured to set a 1st corrected target value $w_1$ to $w_0-0.5R_{w0}$ and calculate an i-th corrected target value $w_i$ by the following formula (5)

$$w_i=(R_{wi-1}w_0-R_{w0}w_{i-1})/(R_{wi-1}-R_{w0}) \quad (5)$$

where $R_{wi-1}$ is a value of the partial differential when the corrected target value "w" is an i−1th corrected target value and "i" is an integer of 2 or more.

(6) The plant control system described in above (1), wherein the reference governor is configured to set the initial value $w_0$ of the corrected target value to a predetermined value between $r-0.5R_r$ and "r".

(7) The plant control system described above (6), wherein if a value $R_r$ of the partial differential when the corrected target value "w" is the provisional target value "r" is positive and a value $R_{w0}$ of the partial differential when the corrected target value "w" is the initial value $w_0$ is negative, the reference governor is configured to calculate an i-th corrected target value $w_i$ by the following formula (4)

$$w_i=(R_{wi-1}r-R_rw_{i-1})/(R_{wi-1}-R_r) \quad (4)$$

where $R_{wi-1}$ is a value of the partial differential when the corrected target value "w" is an i−1th corrected target value $w_{i-1}$ and "i" is an integer of 1 or more.

(8) The plant control system described above (6), wherein if a value $R_r$ of the partial differential when the corrected target value "w" is the provisional target value "r" is positive and a value $R_{w0}$ of the partial differential when the corrected target value "w" is the initial value $w_0$ is positive, the reference governor is configured to set a 1st corrected target value $w_1$ to $w_0-0.5R_{w0}$ and calculate an i-th corrected target value $w_i$ by the following formula (4)

$$w_i=(R_{wi-1}r-R_rw_{i-1})/(R_{wi-1}-R_r) \quad (4)$$

where $R_{wi-1}$ is a value of the partial differential when the corrected target value "w" is an i−1th corrected target value $w_{i-1}$ and "i" is an integer of 2 or more.

(9) The plant control system described above (6), wherein if a value $R_r$ of the partial differential when the corrected target value "w" is the provisional target value "r" is negative and a value $R_{w0}$ of the partial differential when the corrected target value "w" is the initial value $w_0$ is negative, the reference governor is configured to calculate an i-th corrected target value $w_i$ by the following formula (6)

$$w_i=(R_{wi-1}w_{up}-R_{wup}w_{i-1})/(R_{wi-1}-R_{wup}) \quad (6)$$

where an upper limit value $w_{up}$ of the search range is $r-0.5R_r$, $R_{wup}$ is a value of the partial differential when the corrected target value "w" is the upper limit value $w_{up}$, $R_{wi-1}$ is a value of the partial differential when the corrected target value "w" is an i−1th corrected target value $w_{i-1}$, and "i" is an integer of 1 or more.

(10) The plant control system described above (6), wherein if a value $R_r$ of the partial differential when the corrected target value "w" is the provisional target value "r" is negative and a value $R_{w0}$ of the partial differential when the corrected target value "w" is the initial value $w_0$ is positive, the reference governor is configured to set a 1st corrected target value $w_1$ to $w_0-0.5R_{w0}$ and calculate an i-th corrected target value $w_i$ by the following formula (6)

$$w_i=(R_{wi-1}w_{up}-R_{wup}w_{i-1})/(R_{wi-1}-R_{wup}) \quad (6)$$

where an upper limit value $w_{up}$ of the search range is $r-0.5R_r$, $R_{wup}$ is a value of the partial differential when the corrected target value "w" is the upper limit value $w_{up}$, $R_{wi-1}$ is a value of the partial differential when the corrected target value "w" is an i−1th corrected target value $w_{i-1}$, and "i" is an integer of 2 or more.

Advantageous Effects of Invention

According to the present invention, it is possible to reduce the processing load of a reference governor when the reference governor performs a minimum value search of the object function.

DESCRIPTION OF EMBODIMENTS

Figure 1:
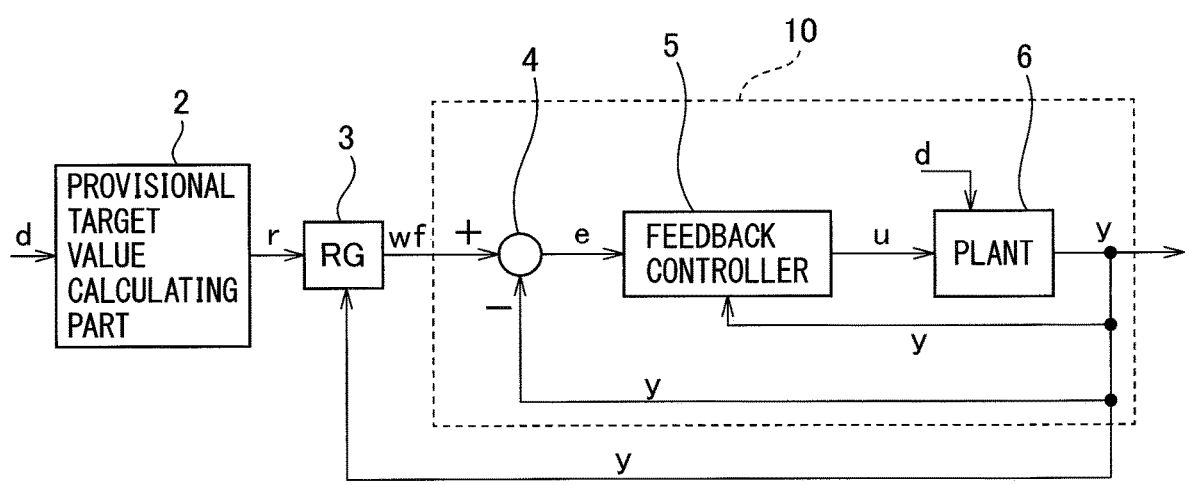
FIG. 1 is a view showing a target value tracking control structure of a plant control system according to a first embodiment.
Figure 2:
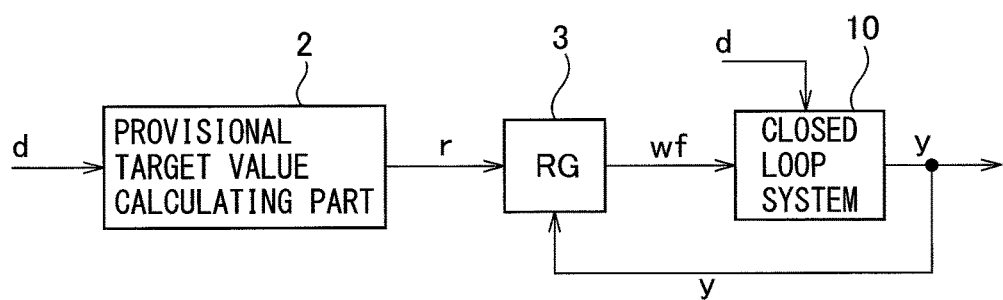
FIG. 2 is a feed forward control structure obtained by equivalent deformation of a target value tracking control structure of FIG. 1.

Below, referring to the drawings, embodiments of the present invention will be explained in detail. Note that, in the following explanation, similar components will be assigned the same reference signs.

First Embodiment

First, referring to FIG. 1 to FIG. 8, a first embodiment of the present invention will be explained.

<Plant Control System>

FIG. 1 is a view showing a target value tracking control structure of a plant control system according to the first embodiment. The plant control system is provided with a provisional target value calculating part 2, reference governor (RG) 3, comparator 4, and feedback controller 5. For example, a microprocessor such as an electronic control unit (ECU) functions as a plant control system.

The part surrounded by the broken line in FIG. 1 functions as a closed loop system 10 performing feedback control so that the control output "y" approaches the target value wf. If a closed loop system 10 is designed, the target value tracking control structure of FIG. 1 is equivalently modified to obtain the feed forward control structure of FIG. 2. Note that, it is also possible to simultaneously control a plurality of state variables of the plant 6 by the closed loop system 10, but in the present embodiment, there is a single state variable of the plant controlled by the closed loop system 10. The number of control output "y" is also one and the number of target value wf is also one.

The comparator 4 subtracts the control output "y" from the target value wf to calculate the difference "e" (=wf-y) and inputs the difference "e" to the feedback controller 5. The target value wf is input by the reference governor 3 to the comparator 4, while the control output "y" is output from the plant 6 to which the control input "u" and exogenous input "d" are input. The exogenous input "d" is a predetermined parameter of the plant 6.

The feedback controller 5 determines the control input "u" so that the control output "y" approaches the target value wf. That is, the feedback controller 5 determines the control input "u" so that the difference "e" approaches zero. In the feedback controller 5, PI control, PID control, or other known control is used. The feedback controller 5 inputs the control input "u" to the plant 6. Further, the control output "y" is input to the feedback controller 5 as a state feedback. Note that, the input of the control output "y" to the feedback controller 5 may be omitted. Further, the comparator 4 may be built into the feedback controller 5.

As explained above, in the closed loop system 10, feedback control is performed so that the control output "y" approaches the target value wf. However, in actual control, due to hardware or control constraints, there are often constraints on the value of the control output "y". For this reason, if the target value calculated without considering such constraints is input to the closed loop system 10, the control output "y" may conflict with the constraints, thus leading to deterioration of the transitional response and control instability.

Therefore, in the present embodiment, the provisional target value calculating part 2 and the reference governor 3 are used to calculate the target value wf of the control output "y". If the exogenous input "d" is input to the provisional target value calculating part 2, the provisional target value calculating part 2 calculates a provisional target value "r" based on the exogenous input "d" and outputs the provisional target value "r" to the reference governor 3. The provisional target value calculating part 2, for example, is the target value map by which the relationship between the exogenous input "d" and the provisional target value "r" is shown.

The reference governor 3 corrects the provisional target value "r" to calculate the target value wf so that the degree of satisfaction of the constraint condition relating to the control output "y" becomes higher. Specifically, the reference governor 3 performs a minimum value search of the object function by updating the corrected target value "w" to thereby derive the target value wf from the provisional target value "r".

The object function is determined considering the degree of satisfaction of the constraint condition relating to the control output "y". In the present embodiment, the control output "y" has the upper limit value $y_{up}$. In this case, the object function J(w) is defined by the following formula (1).

[Mathematical Equation 3]

$$J(w) = (r-w)^2 + \rho \sum_{k=1}^{N} \max\{y_k - y_{up}, 0\} \quad (1)$$

Here, "k" is a time step, $y_k$ is the future predicted value of the control output "y" at the time step "k", ρ is the weighting coefficient, and N is the number of prediction steps (prediction horizon). Note that, the weighting coefficient ρ is a predetermined positive value.

The object function J(w) includes a correction term showing the amount of correction of the target value (first term on right side of formula (1)) and a penalty function showing the degree of satisfaction of the constraint condition relating to the control output "y" (second term on right side of formula (1)). The correction term is the square of the difference between the provisional target value "r" and the corrected target value "w". For this reason, the value of the object function J(w) becomes smaller the smaller the difference between the provisional target value "r" and the corrected target value "w", that is, the smaller the amount of correction of the target value. Further, the penalty function is configured so that when the future predicted value $y_k$ of the control output y exceeds the upper limit value $y_{up}$, the difference between the future predicted value $y_k$ and the upper limit value $y_{up}$ is given as a penalty to the object function J(w). For this reason, the value of the object function J(w) becomes smaller the smaller the amount by which the future predicted value $y_k$ of the control output y exceeds the upper limit value $y_{up}$.

The reference governor 3 uses the model of the plant 6 to calculate the future predicted value $y_k$ of the control output "y" by the following formula (3).

$$y_{k+1} = Ay_k + Bw \tag{3}$$

Here, A and B are predetermined constants.

First, using the control output $y_0$ at the time of calculation of the future predicted value, the future predicted value $y_1$ of the control output "y" one step ahead from the time of calculation is calculated by the following formula (7). The control output $y_0$ at the time of calculation is detected by a sensor or other detector or is estimated using a calculation formula etc. Next, using the future predicted value $y_1$, the future predicted value $y_2$ of the control output "y" two steps ahead from the time of calculation is calculated by the following formula (8), and using the future predicted value $y_2$, the future predicted value $y_3$ of the control output "y" three steps ahead from the time of calculation is calculated by the following formula (9). After that, the future predicted values $y_k$ of the control output "y" until the future predicted values $y_N$ of the control output "y" N steps ahead from the time of calculation are successively calculated by the following formula (10). As a result, a total of N number of future predicted values of the control output "y" are calculated. Note that, the value of the time corresponding to 1 step multiplied with the number of prediction steps N becomes the prediction section.

$$y_1 = Ay_0 + Bw \tag{7}$$

$$y_2 = Ay_1 + Bw = A^2 y_0 + (A+1)Bw \tag{8}$$

$$y_3 = Ay_2 + Bw = A^3 y_0 + (A^2 + A + 1)Bw \tag{9}$$

$$y_k = A^k y_0 + (A^{k-1} + A^{k-2} + \ldots + 1)Bw \tag{10}$$

Figure 3:
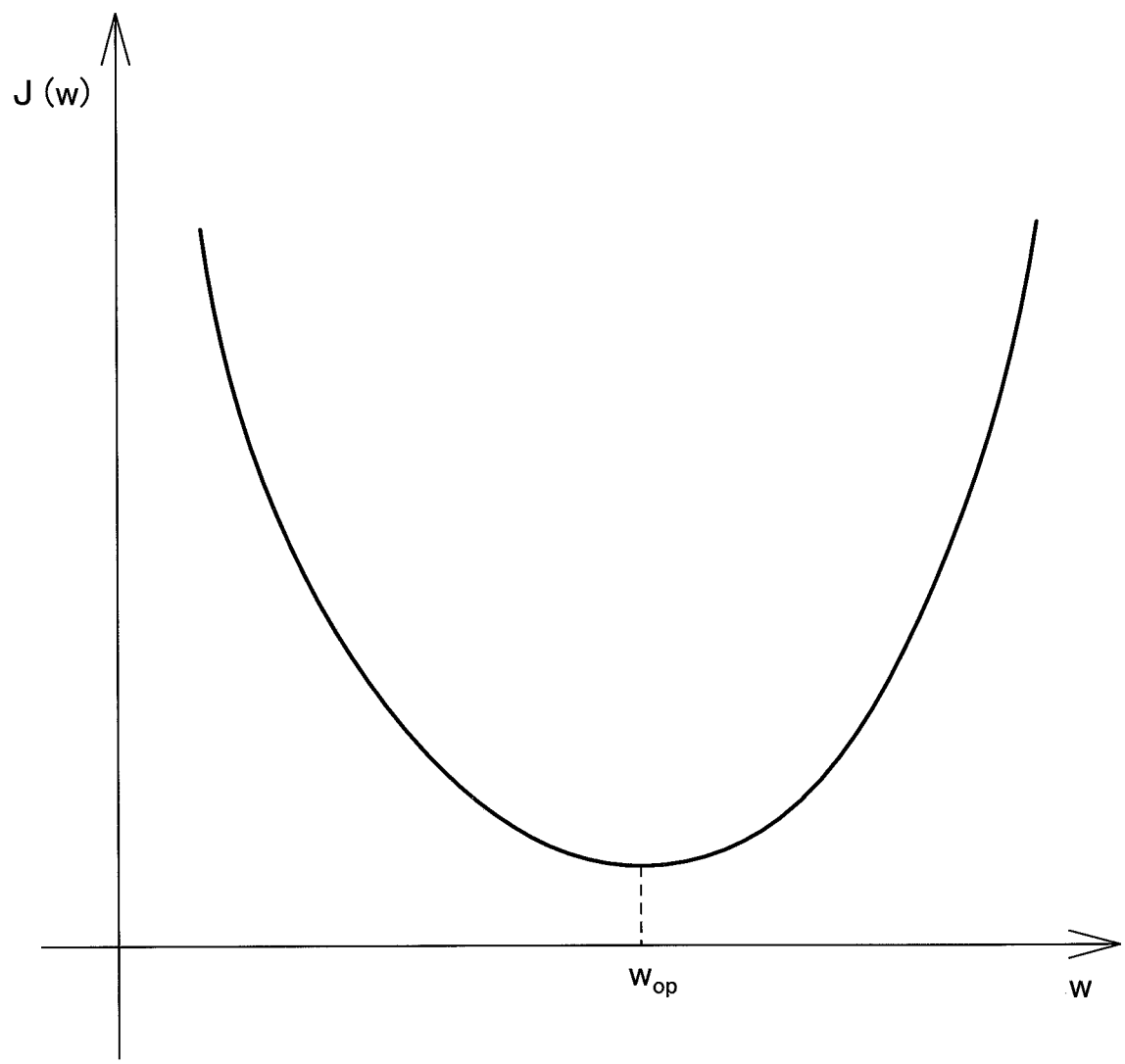
FIG. 3 is a graph schematically showing an object function.

FIG. 3 is a graph schematically showing the object function J(w). In the graph of FIG. 3, the x-axis indicates the corrected target value "w", while the y-axis indicates the object function J(w). The object function J(w) is a downward protruding function (convex function). For this reason, the object function J(w) becomes the minimum at the point when the slant (gradient) of the object function J(w) becomes zero. The corrected target value "w" when the object function J(w) becomes minimum is the optimum target value $w_{op}$. Therefore, by searching for the point where the slant of the object function J(w) becomes zero, it is possible to search for the minimum value of the object function J(w).

Here, if making $\max\{y_k - y_{up}, 0\} = f_1(y_k)$, the formula (1) becomes the following formula (11).

[Mathematical Equation 4]

$$J(w) = (r-w)^2 + \rho \sum_{k=1}^{N} f_1(y_k) \tag{11}$$

The slant of the object function J(w) is obtained by the following formula (12) as the partial differential for the corrected target value "w" of the object function J(w).

[Mathematical Equation 5]

$$\frac{\partial J}{\partial w} = 2(w-r) + \rho \sum_{k=1}^{N} \frac{\partial f_1}{\partial y_k} \frac{\partial y_k}{\partial w} \tag{12}$$

Figure 4:
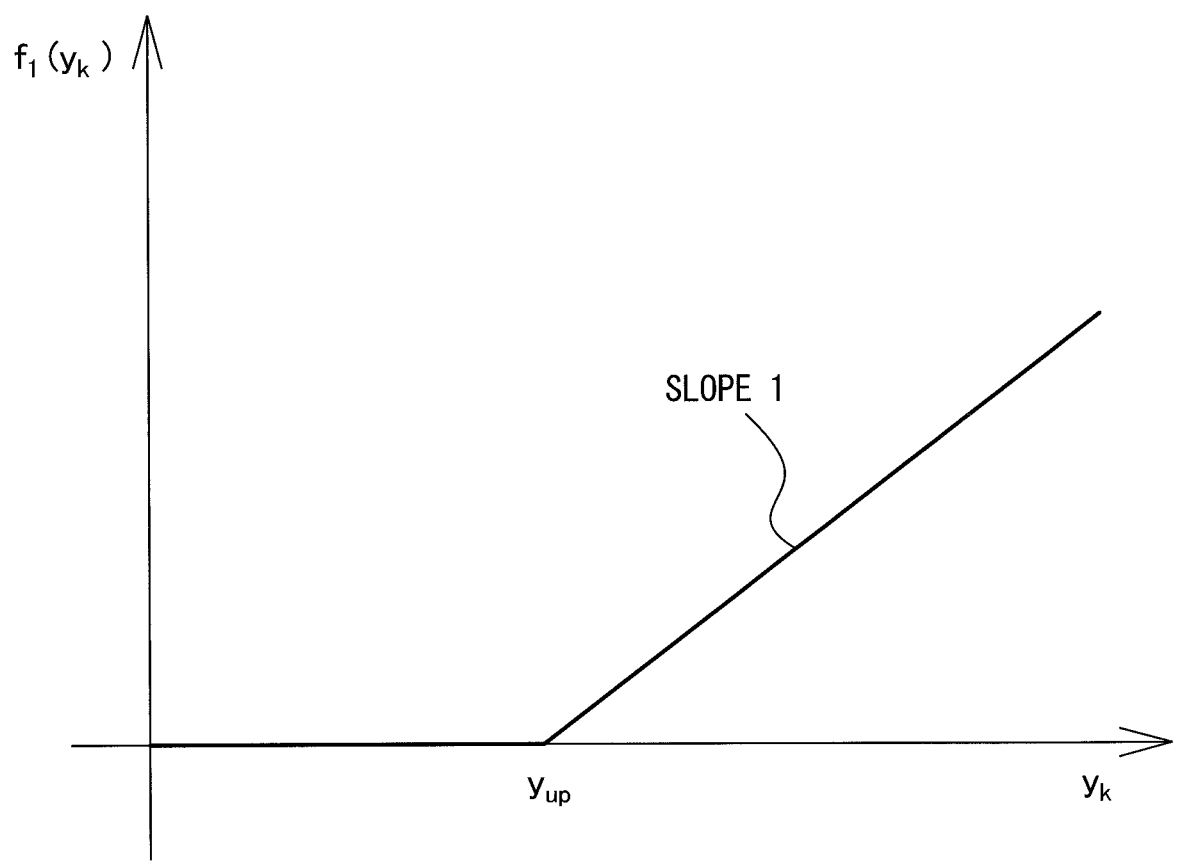
FIG. 4 is a graph showing a first function.
Figure 5:
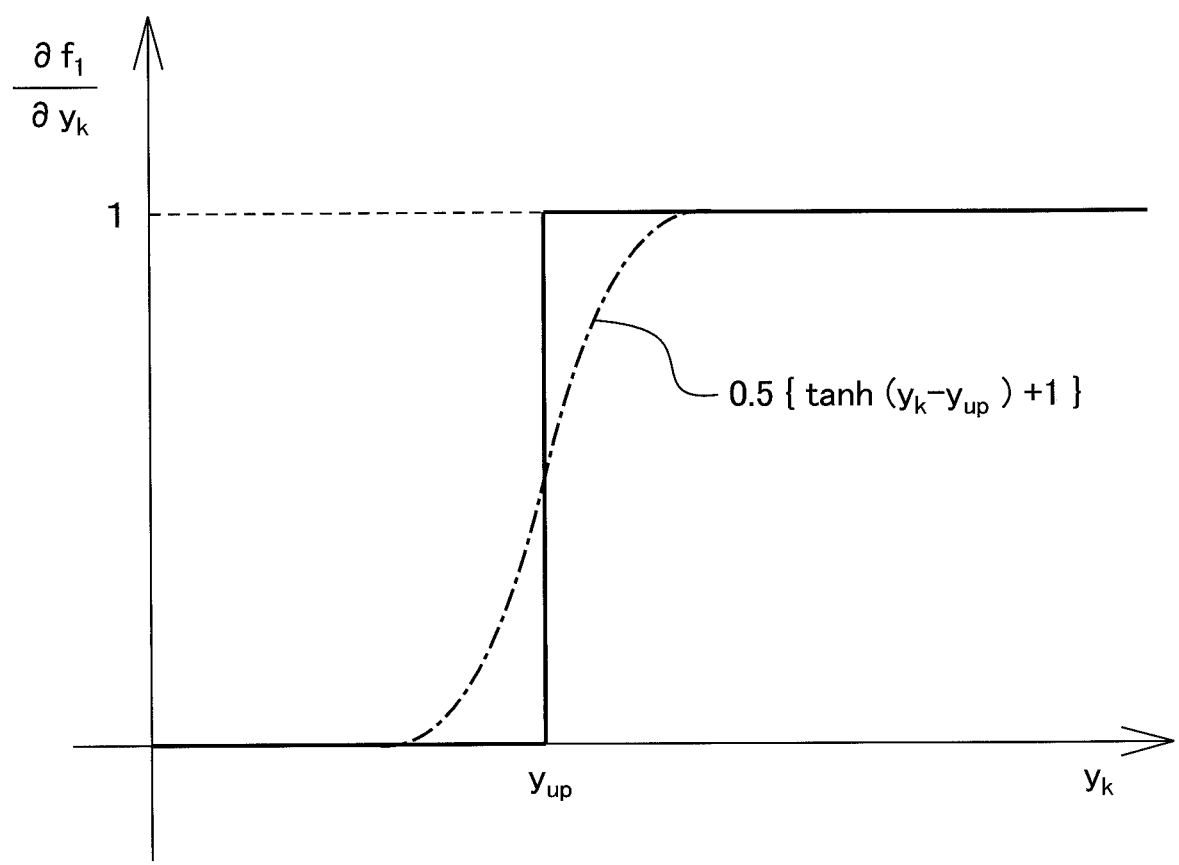
FIG. 5 is a graph showing a partial differential for a future predicted value of a control output of a first function.

FIG. 4 is a graph showing the first function $f_1(y_k)$. In the graph of FIG. 4, the x-axis indicates the future predicted value $y_k$ of the control output "y", while the y-axis indicates the first function $f_1(y_k)$. FIG. 5 is a graph showing the partial differential for the future predicted value $y_k$ of the first function $f_1(y_k)$. In the graph of FIG. 5, the x-axis indicates the future predicted value $y_k$ of the control output "y", while the y-axis indicates the partial differential for the future predicted value $y_k$ of the first function $f_1(y_k)$.

As shown in FIG. 5, the partial differential for the future predicted value $y_k$ of the first function $f_1(y_k)$ becomes a discontinuous step function. Here, this step function is approximated by a continuous function such as in the following formula (13).

[Mathematical Equation 6]

$$\frac{\partial f_1}{\partial y_k} \approx 0.5\{\tanh(y_k - y_{up}) + 1\} \tag{13}$$

The curve expressed by the formula (13) is shown by the one-dot chain line in FIG. 5.

Further, as clear from the formula (10), the partial differential for the corrected target value "w" of the future predicted value $y_k$ becomes the following formula (14).

[Mathematical Equation 7]

$$\frac{\partial y_k}{\partial w} = (A^{k-1} + A^{k-2} + \ldots + 1)B \tag{14}$$

If making $(A^{k-1} + A^{k-2} + \ldots + 1)B = P_k$ and making $A^k y_0 - y_{up} = q_k$, the following formula (15) is obtained.

$$y_k - y_{up} = (A^k y_0 - y_{up}) + P_k w = q_k + P_k w \tag{15}$$

From the formulas (12), (13), (14), and (15), the following formula (16) is obtained.

[Mathematical Equation 8]

$$\frac{\partial J}{\partial w} = 2(w-r) + \rho \sum_{k=1}^{N} 0.5\{\tanh(P_k w + q_k) + 1\} P_k \tag{16}$$

If it is possible to find the corrected target value "w" where the value of the partial differential for the corrected target value "w" of the object function J(w) (below, simply referred to as the "partial differential of the object function") becomes zero, the optimum target value is obtained. However, the corrected target value "w" where the value of the partial differential of the object function becomes zero cannot be directly found from the formula (16).

On the other hand, the second order partial differential for the corrected target value "w" of the object function J(w) (below, simply referred to as the "second order partial differential of the object function") becomes the following formula (18) by utilization of the following formula (17).

[Mathematical Equation 9]

$$(\tanh x)' = \frac{4}{(e^x + e^{-x})^2} = \frac{1}{\cosh^2 x} \quad (17)$$

[Mathematical Equation 10]

$$\frac{\partial^2 J}{\partial w^2} = 2 + \rho \sum_{k=1}^{N} 0.5 \frac{P_k^2}{\cosh^2(P_k w + q_k)} \quad (18)$$

The second term on the right side of the formula (18) always becomes zero or more. For this reason, the value of the second order partial differential of the object function always becomes 2 or more. Therefore, the partial differential of the object function monotonously increases by a slant of 2 or more.

Figure 6:
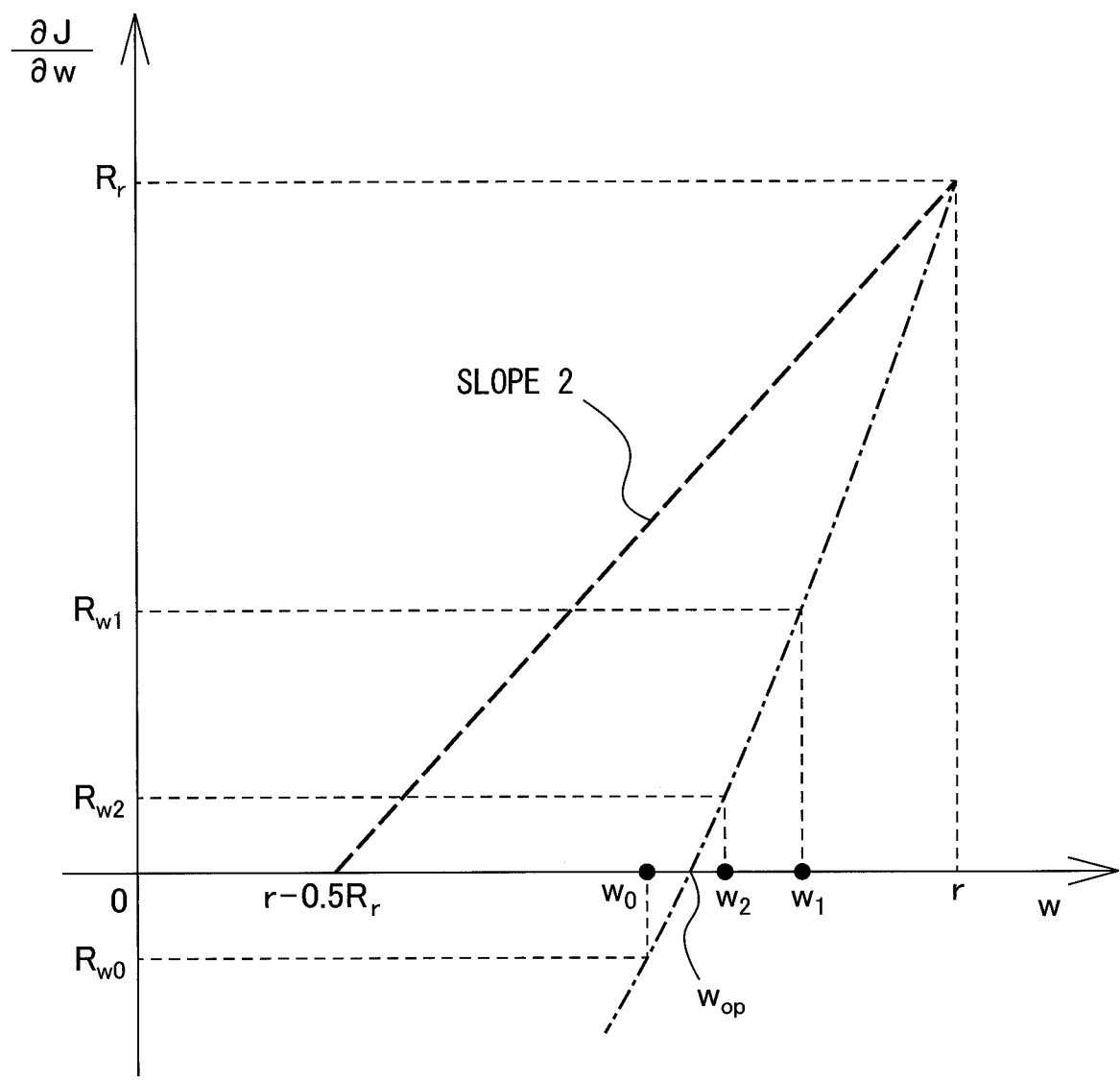
FIG. 6 is a view for explaining a method of updating a corrected target value in a first embodiment using a graph showing a partial differential for a corrected target value of an object function.
Figure 7:
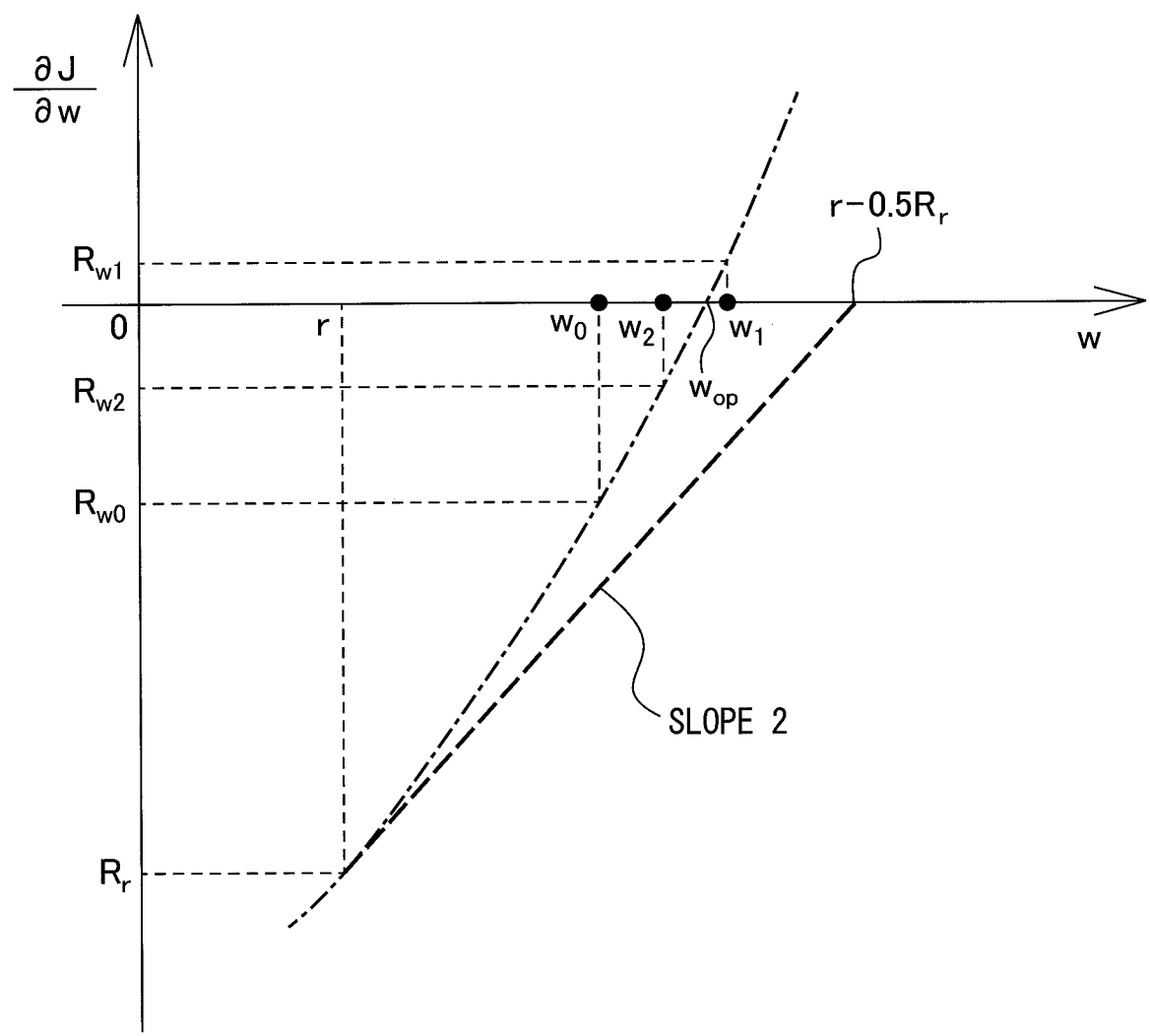
FIG. 7 is a view for explaining a method of updating a corrected target value in a first embodiment using a graph showing a partial differential for a corrected target value of an object function.

FIG. 6 and FIG. 7 are views for explaining the method of updating the corrected target value in the first embodiment using graphs showing the partial differential of the object function. In the graphs of FIG. 6 and FIG. 7, the x-axis indicates the corrected target value "w", while the y-axis indicates the partial differential of the object function. FIG. 6 and FIG. 7 show the actual partial differential of the object function by one-dot chain lines. The corrected target value "w" when the partial differential of the object function becomes zero is the optimum target value $w_{op}$.

As stated above, the reference governor 3 performs a minimum value search of the object function by updating the corrected target value "w" to thereby derive the target value wf from the provisional target value "r". If the provisional target value "r" is input to the reference governor 3, the reference governor 3 calculates the value $R_r$ of the partial differential of the object function when the corrected target value "w" is the provisional target value "r". $R_r$ is obtained by entering "r" for "w" at the right side of the formula (16). Note that, at this time, the first term of the right side of the formula (16) becomes zero. In the example of FIG. 6, $R_r$ is positive, while in the example of FIG. 7, $R_r$ is negative.

First, the example of FIG. 6 where $R_r$ is positive will be explained. As explained above, the slant of the partial differential of the object function is 2 or more. For this reason, the partial differential of the object function passes through the point $R_r$ and monotonously increases by a slant of 2 or more. If $R_r$ is positive, the intersection ($r-0.5R_r$) of the line of the slant 2 passing through the point $R_r$ and the x-axis becomes the lower limit value of the range where a corrected target value $w_{op}$ where the value of the partial differential of the object function becomes zero can be present. On the other hand, "r" becomes the upper limit value of the range where the corrected target value $w_{op}$ where the value of the partial differential of the object function becomes zero can be present. Therefore, the optimum corrected target value $w_{op}$ is present between $r-0.5R_r$ and "r". At the corrected target value $w_{op}$, the object function becomes the minimum.

Based on the above discoveries, the reference governor 3 updates the corrected target value "w" only between $r-0.5R_r$ and "r". Due to this, it is possible to limit the range of search to a narrow range and it becomes easy to make the corrected target value "w" approach the optimum corrected target value $w_{op}$. As a result, it is possible to reduce the processing load of the reference governor 3.

The value of the partial differential of the object function becomes larger as the corrected target value "w" becomes larger. For this reason, for example, the reference governor 3 updates the corrected target value "w" by the binary search method in the above range of search. By doing this, it is possible to make the corrected target value "w" effectively approach the optimum corrected target value $w_{op}$ and possible to reduce the processing load of the reference governor 3 much more.

By the binary search method, the initial value $w_0$ of the corrected target value "w" is set to the midpoint (($2r-0.5R_r$)/2) of the upper limit value "r" and the lower limit value $r-0.5R_r$. The value $R_{w0}$ of the partial differential of the object function when the corrected target value "w" is the initial value $w_0$ is obtained by entering $w_0$ for "w" at the right side of the formula (16). In the example of FIG. 6, $R_{w0}$ is negative. For this reason, the corrected target value "w" is updated so that the corrected target value "w" becomes larger. Specifically, the first corrected target value $w_1$ is set to the midpoint of the upper limit value "r" and the initial value $w_0$ ($w_1=(w_0+r)/2$).

The value $R_{w1}$ of the partial differential of the object function when the corrected target value "w" is the first corrected target value $w_1$ is obtained by entering $w_1$ for "w" at the right side of the formula (16). In the example of FIG. 6, $R_{w1}$ is positive. For this reason, the corrected target value "w" is updated so that the corrected target value "w" becomes smaller. Specifically, the second corrected target value $w_2$ is set to the midpoint ($w_2=(w_0+w_1)/2$) of the first corrected target value $w_1$ and the initial value $w_0$. After that, the i-th corrected target values $w_i$ are similarly successively set. Note that, "i" indicates the number of times of updating and the "i-th corrected target value $w_i$" means the corrected target value after being updated "i" number of times.

The reference governor 3 ends the updating of the corrected target value "w" and sets the final corrected target value $w_i$ to the target value wf when the value of the partial differential of the object function corresponding to the corrected target value "w" becomes zero or when the number of time of updating the corrected target value "w" reaches a predetermined value.

Next, the example of FIG. 7 where $R_r$ is negative will be explained. As explained above, the partial differential of the object function passes through the point $R_r$ and monotonously increases by a slant 2 or more. If $R_r$ is negative, the intersection ($r-0.5R_r$) of the line of the slant 2 passing through the point $R_r$ and the x-axis becomes the upper limit value of a range where a corrected target value $w_{op}$ where the value of the partial differential of the object function becomes zero can be present. On the other hand, "r" becomes the lower limit value of the range where a corrected target value $w_{op}$ where the value of the partial differential of the object function becomes zero can be present. Therefore, in the same way as the example of FIG. 6, the optimum corrected target value $w_{op}$ is present between $r-0.5R_r$ and "r". At the corrected target value $w_{op}$, the object function becomes the minimum.

In the example of FIG. 7 as well, in the same way as the example of FIG. 6, the reference governor 3 can update the corrected target value "w" by the binary search method in the above range of search. For reference, FIG. 7 shows initial value $w_0$, the first corrected target value $w_1$, and the second corrected target value $w_2$ of the corrected target value "w" set by the binary search method.

<Processing for Deriving Target Value>

Figure 8:
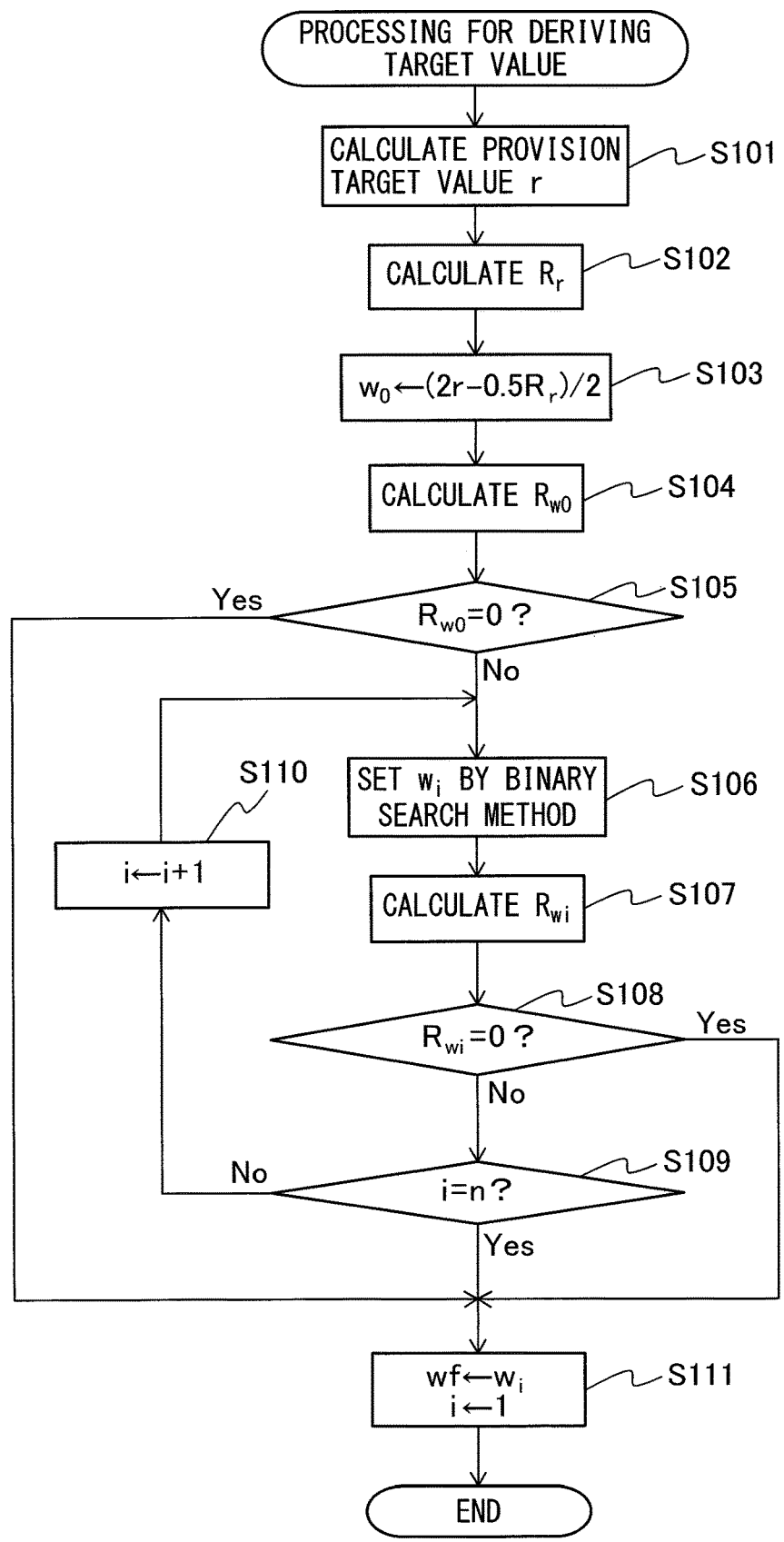
FIG. 8 is a flow chart showing a control routine of processing for deriving a target value in a first embodiment.

Below, referring to the flow chart of FIG. 8, control for deriving a target value wf will be explained in detail. FIG. 8 is a flow chart showing a control routine of processing for deriving a target value in the first embodiment. The present control routine is executed by the plant control system.

First, at step S101, the provisional target value "r" is calculated based on the exogenous input "d". Next, at step S102, the value $R_r$ of the partial differential of the object function when the corrected target value "w" is the provisional target value "r" is calculated. Next, at step S103, the initial value $w_0$ of the corrected target value "w" is set to $(2r-0.5R_r)/2$.

Next, at step S104, the value $R_{w0}$ of the partial differential of the object function when the corrected target value "w" is the initial value $w_0$ is calculated. Next, at step S105, it is judged whether the value $R_{w0}$ of the partial differential is zero. If it is judged that the value $R_{w0}$ of the partial differential is not zero, the present control routine proceeds to step S106.

At step S106, the i-th corrected target value $w_i$ is set by the binary search method. The initial value of the update number "i" is 1. Next, at step S107, the value $R_{wi}$ of the partial differential of the object function when the corrected target value "w" is the i-th corrected target value $w_i$ is calculated. Next, at step S108, it is judged whether the value $R_{wi}$ of the partial differential is zero. If it is judged that the value $R_{wi}$ of the partial differential is not zero, the present control routine proceeds to step S109.

At step S109, it is judged whether the number of times "i" of updating is a predetermined value "n". The predetermined value "n" is an integer of 2 or more. If it is judged that the number of times "i" of updating is not the predetermined value "n", the present control routine proceeds to step S110. At step S110, the number of times "i" of updating is incremented by 1. After step S110, the present control routine returns to step S106.

On the other hand, if at step S105 it is judged that the value $R_{w0}$ of the partial differential is zero, if at step S108 it is judged that the value $R_{wi}$ of the partial differential is zero, or if at step S109 it is judged that the number of times "i" of updating is the predetermined value "n", the present control routine proceeds to step S111. At step S111, the target value wf is set to the final corrected target value $w_i$, and the number of times "i" of updating is reset to 1. After step S111, the present control routine ends.

Note that, the reference governor 3 may set the initial value $w_0$ of the corrected target value "w" to a predetermined value between $r-0.5R_r$ and "r" without using the binary search method. In this case, when the value $R_{w0}$ of the partial differential of the object function when the corrected target value "w" is the initial value $w_0$ is negative, the corrected target value "w" is made larger by exactly a predetermined amount, while when the value $R_{w0}$ of the partial differential of the object function when the corrected target value "w" is the initial value $w_0$ is positive, the corrected target value "w" is made smaller by exactly a predetermined amount. After that, the corrected target value "w" is similarly updated. In this case as well, the reference governor 3 ends the minimum value search of the object function and sets the final corrected target value $w_i$ to the target value wf when the value of the partial differential of the object function corresponding to the corrected target value "w" becomes zero or when the number of time of updating the corrected target value "w" reaches a predetermined value.

Second Embodiment

The configuration and control of the plant control system in the second embodiment are basically similar to the plant control system of the first embodiment except for the points explained below. For this reason, below, the second embodiment of the present invention will be explained focusing on the parts different from the first embodiment.

In the second embodiment, the reference governor 3 sets the initial value $w_0$ of the corrected target value "w" to $r-0.5R_r$. "r" is the provisional target value, while $R_r$ is the value of the partial differential of the object function when the corrected target value "w" is the provisional target value "r". $R_r$ is obtained by entering "r" for "w" at the right side of the formula (16).

Figure 9:
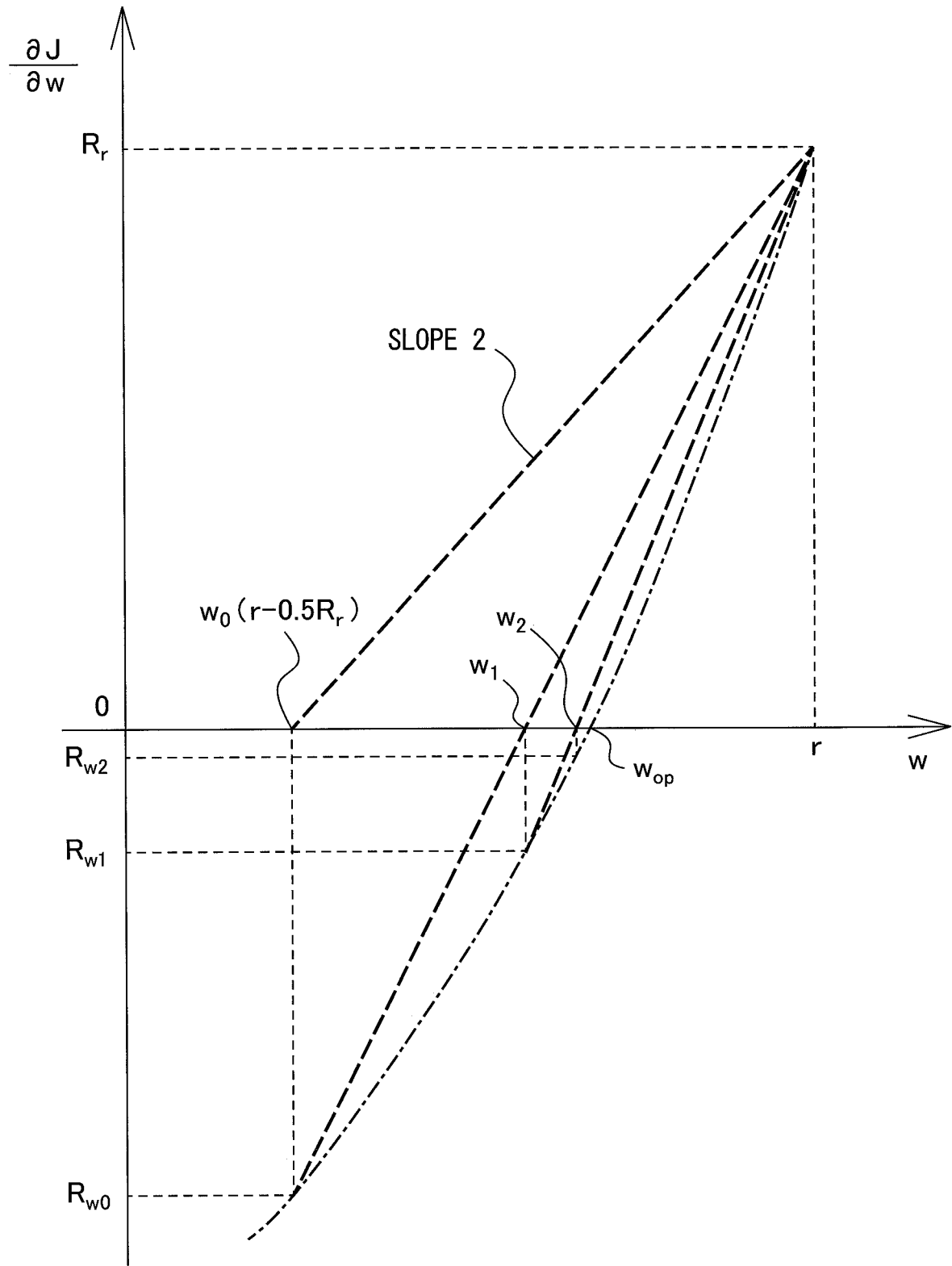
FIG. 9 is a view for explaining a method of updating a corrected target value in a second embodiment using a graph showing a partial differential for a corrected target value of an object function.
Figure 10:
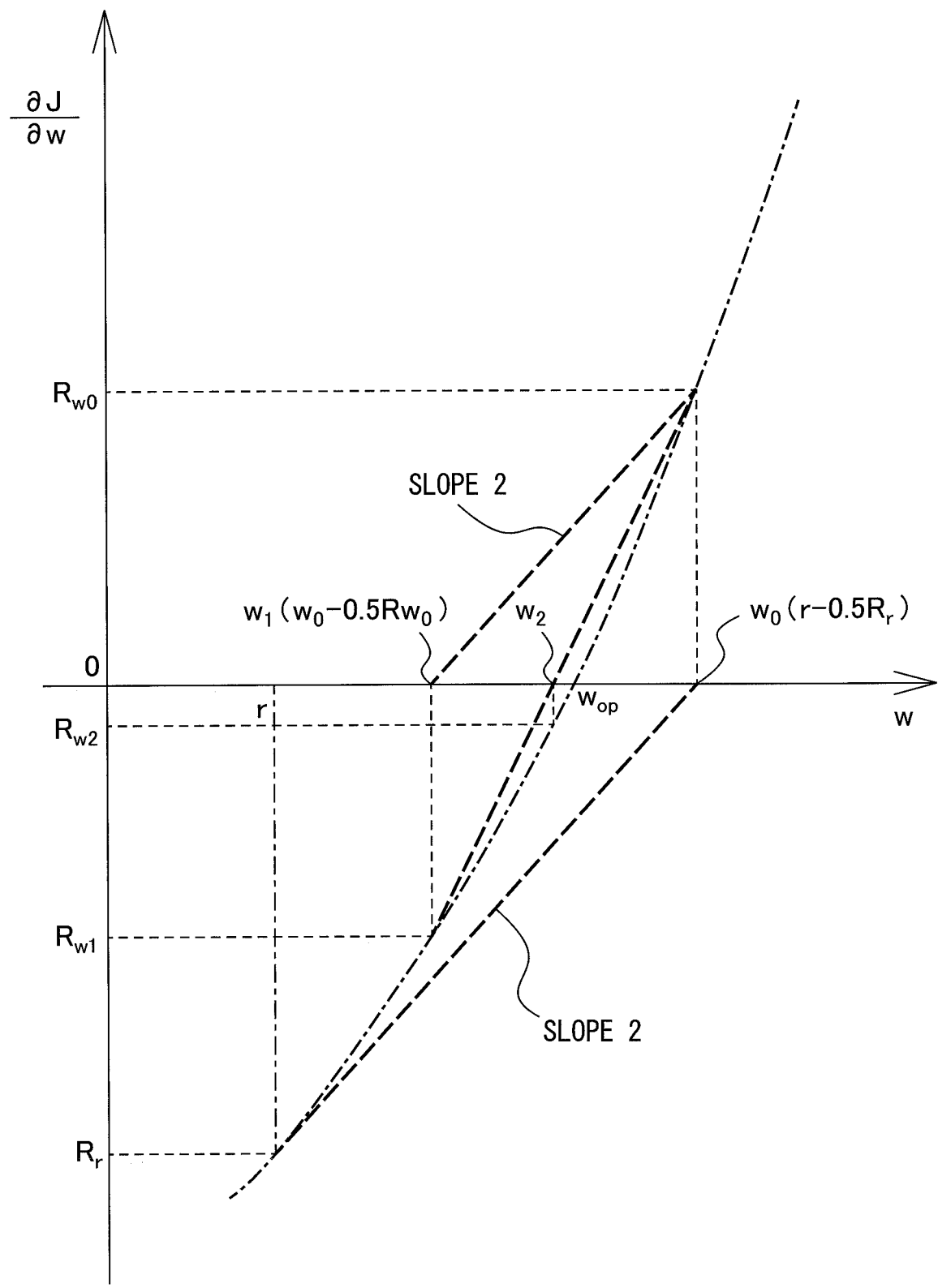
FIG. 10 is a view for explaining a method of updating a corrected target value in a second embodiment using a graph showing a partial differential for a corrected target value of an object function.

FIG. 9 and FIG. 10 are views for explaining the method of updating the corrected target value in the second embodiment using graphs showing the partial differential of the object function. In the graphs of FIG. 9 and FIG. 10, the x-axis indicates the corrected target value "w", while the y-axis indicates the partial differential of the object function. FIG. 9 and FIG. 10 show the actual partial differential of the object function by one-dot chain lines. The corrected target value "w" when the partial differential of the object function becomes zero is the optimum target value $w_{op}$.

First, the example of FIG. 9 will be explained. In the example of FIG. 9, the value $R_r$ of the partial differential of the object function when the corrected target value "w" is the provisional target value "r" is positive. Further, the value $R_{w0}$ of the partial differential of the object function when the corrected target value "w" is the initial value $w_0$ is negative. The partial differential of the object function monotonously increases, so the optimum target value $w_{op}$ becomes a value larger than the initial value $w_0$.

In the example of FIG. 9, the reference governor 3 updates the corrected target value "w" by linear approximation. Specifically, the reference governor 3 sets the intersection of the line passing through the point $R_r$ and the point $R_{w0}$ and the x-axis to the first corrected target value $w_1$.

Figure 11:
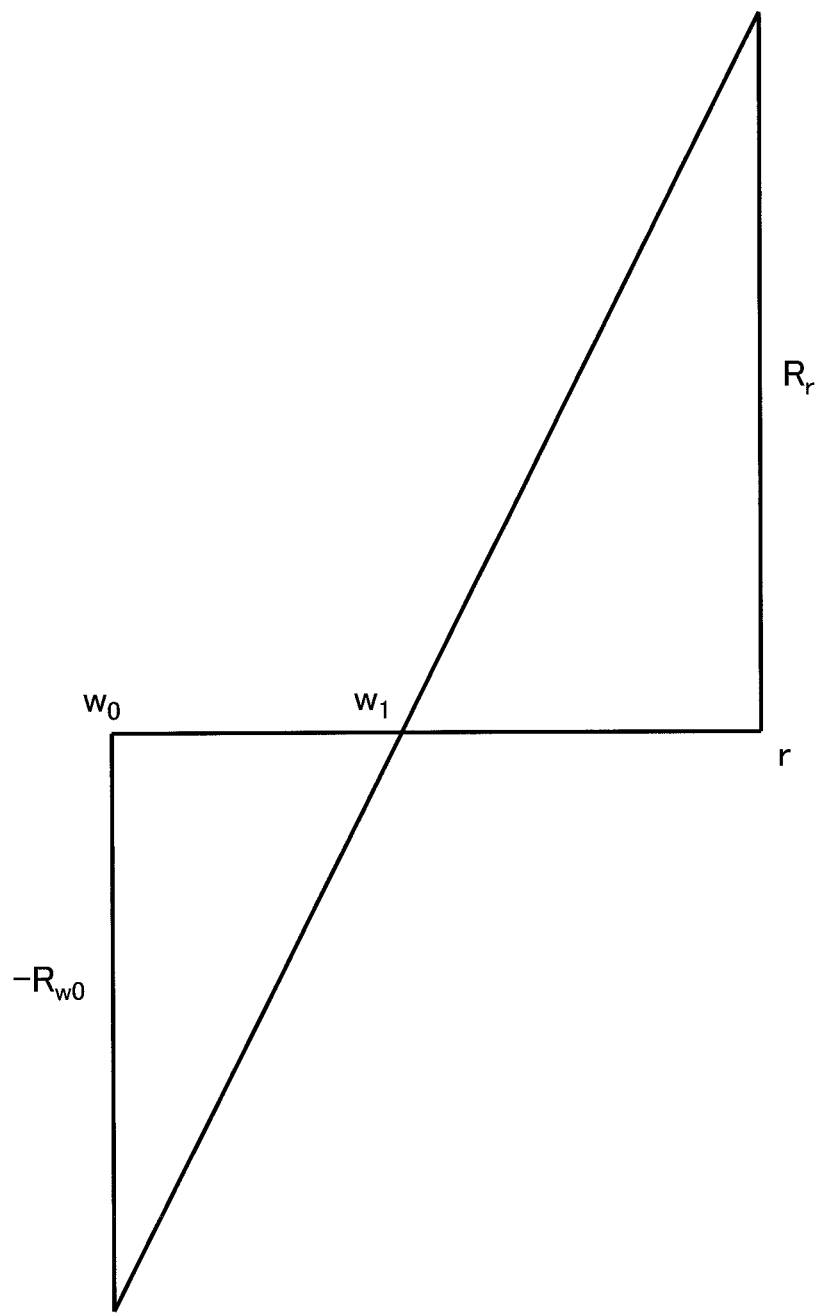
FIG. 11 is a view showing the similarity of triangles utilized for updating the corrected target value.

The first corrected target value $w_1$ is calculated by the following formula (20) derived from the following formula (19) utilizing the similarity of triangles such as shown in FIG. 11.

$$(w_1-w_0):(r-w_1)=-R_{w0}:R_r \tag{19}$$

$$w_1=(R_{w0}r-R_r w_0)/(R_{w0}-R_r) \tag{20}$$

Next, the reference governor 3 sets the intersection of the line passing through the point $R_r$ and the point $R_{w1}$ and the x-axis to the second corrected target value "$w_2$". The second corrected target value "$w_2$" is calculated by the following formula (22) derived from the following formula (21) utilizing the similarity of triangles. Note that, $R_{w1}$ is obtained by entering $w_1$ for "w" at the right side of the above formula (13).

$$(w_2-w_1):(r-w_2)=-R_{w1}:R_r \tag{21}$$

$$w_2=(R_{w1}r-R_r w_1)/(R_{w1}-R_r) \tag{22}$$

The third and later corrected target values are also similarly calculated. Therefore, the reference governor 3 calculates the i-th corrected target value $w_i$ by the following formula (4) if the value $R_{w0}$ of the partial differential of the object function when the corrected target value "w" is the initial value $w_0$ is negative.

$$w_i=(R_{wi-1}r-R_r w_{i-1})/(R_{wi-1}-R_r) \tag{4}$$

Here, $R_{wi-1}$ is the value of the partial differential of the object function when the corrected target value "w" is the i−1th corrected target value $w_{i-1}$, while the number of times "i" of updating is an integer of 1 or more. $R_{wi-1}$ is obtained by entering $w_{i-1}$ for "w" at the right side of the above formula (16).

Next, the example of FIG. 10 will be explained. In the example of FIG. 10, the value $R_r$ of the partial differential of the object function when the corrected target value "w" is the provisional target value "r" is negative. Further, the value $R_{w0}$ of the partial differential of the object function when the corrected target value "w" is the initial value $w_0$ is positive.

In this case, the reference governor 3 sets the intersection $(w_0−0.5R_{w0})$ of the line of the slant 2 passing through the point $R_r$ and the x-axis to the first corrected target value $w_1$. As a result, the value $R_{w1}$ of the partial differential of the object function when the corrected target value "w" is the first corrected target value $w_1$ becomes negative. The partial differential of the object function monotonously increases, so the optimum target value $w_{op}$ becomes a value larger than the first corrected target value $w_1$. Note that, $R_{w1}$ is obtained by entering $w_1$ for "w" at the right side of the above formula (16).

After that, the reference governor 3 updates the corrected target value "w" by linear approximation. Specifically, the reference governor 3 sets the intersection between the line passing through the point $R_{w0}$ and the point $R_{w1}$ and the x-axis to the second corrected target value $w_2$. The second corrected target value $w_2$ is calculated by the following formula (24) derived from the following formula (23) utilizing the similarity of triangles.

$$(w_2-w_1):(w_0-w_2)=-R_{w1}:R_{w0} \quad (23)$$

$$w_2=(R_{w1}w_0-R_{w0}w_1)/(R_{w1}-R_{w0}) \quad (24)$$

The third and later corrected target values are also similarly calculated. Therefore, the reference governor 3 sets the first corrected target value $w_1$ to $w_0−0.5R_{w0}$ and calculates the i-th corrected target value $w_i$ by the following formula (5), if the value $R_{w0}$ of the partial differential of the object function when the corrected target value "w" is the initial value $w_0$ is positive. In this case, the number of times "i" of updating is an integer of 2 or more.

$$w_i=(R_{wi-1}w_0-R_{w0}w_{i-1})/(R_{wi-1}-R_{w0}) \quad (5)$$

Further, in the same way as the first embodiment, the reference governor 3 ends the updating of the corrected target value "w" and sets the final corrected target value $w_i$ to the target value wf when the value of the partial differential of the object function corresponding to the corrected target value "w" becomes zero or when the number of time of updating the corrected target value "w" reaches a predetermined value.

By updating the corrected target value "w" by linear approximation in this way, it is possible to effectively make the corrected target value "w" approach the optimum corrected target value $w_{op}$. Therefore, the processing load of the reference governor 3 can be reduced even more.

<Processing for Deriving Target Value>

Figure 12:
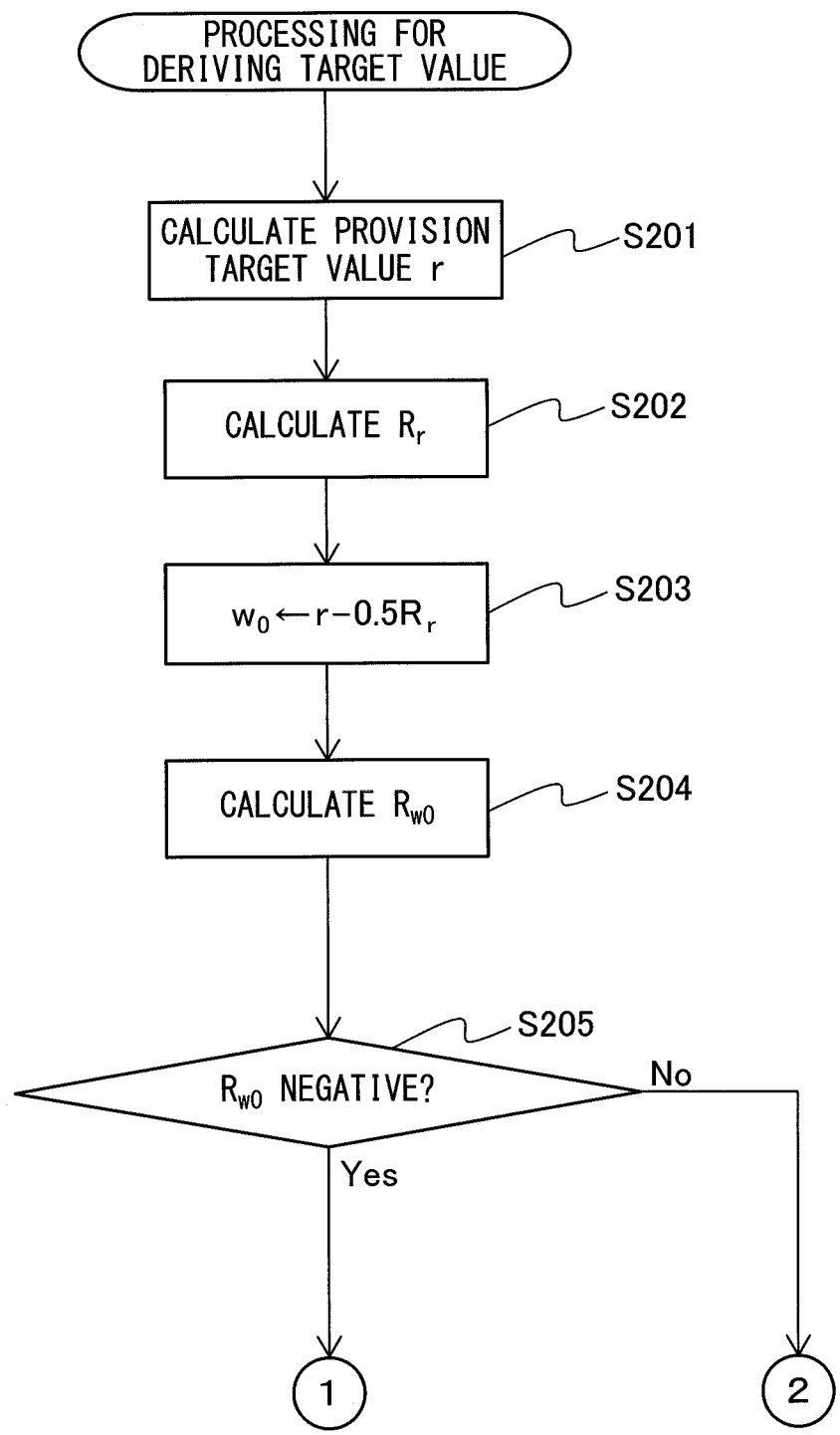
FIG. 12 is a flow chart showing a control routine of processing for deriving a target value in a second embodiment.
Figure 13:
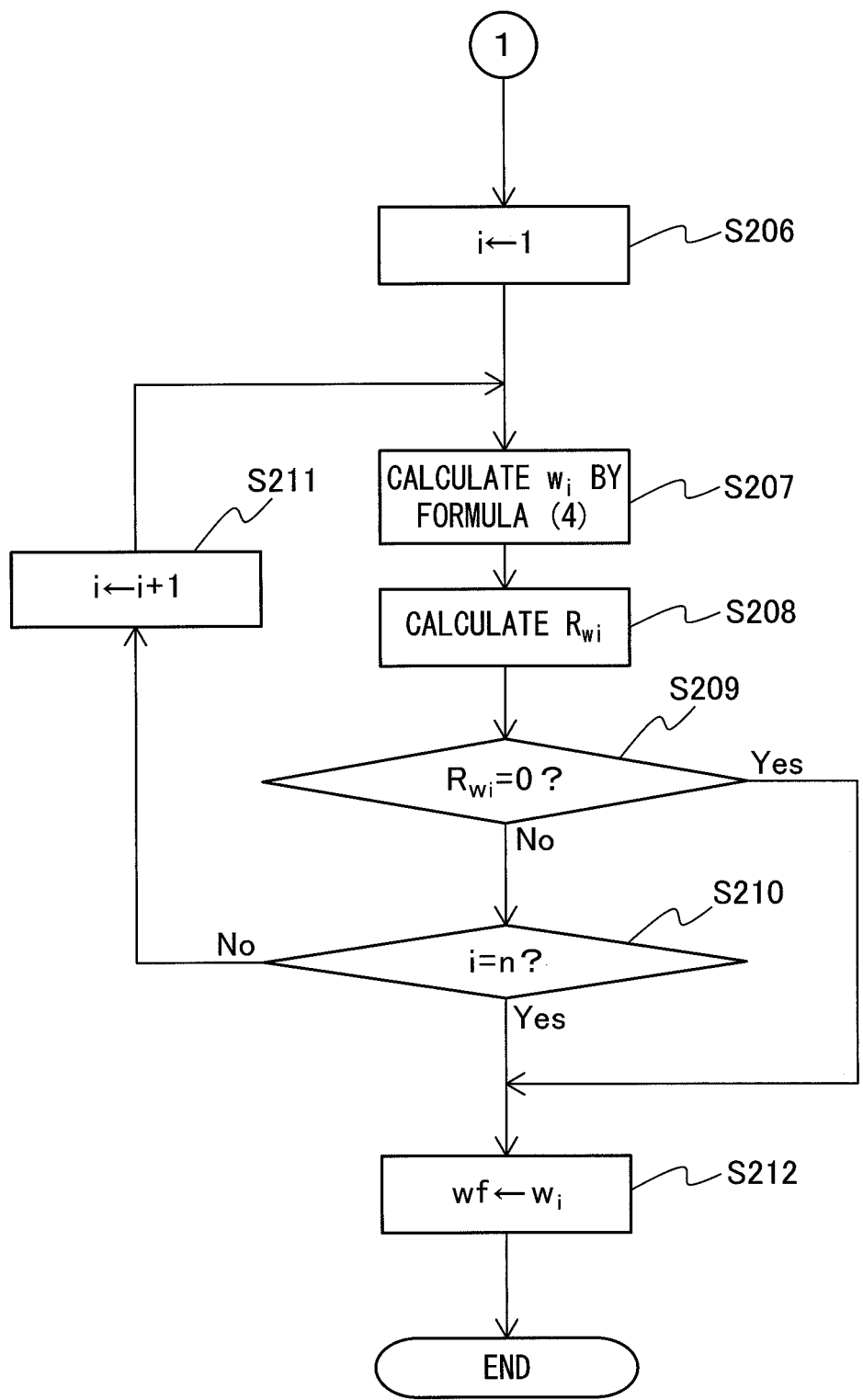
FIG. 13 is a flow chart showing a control routine of processing for deriving a target value in a second embodiment.
Figure 14:
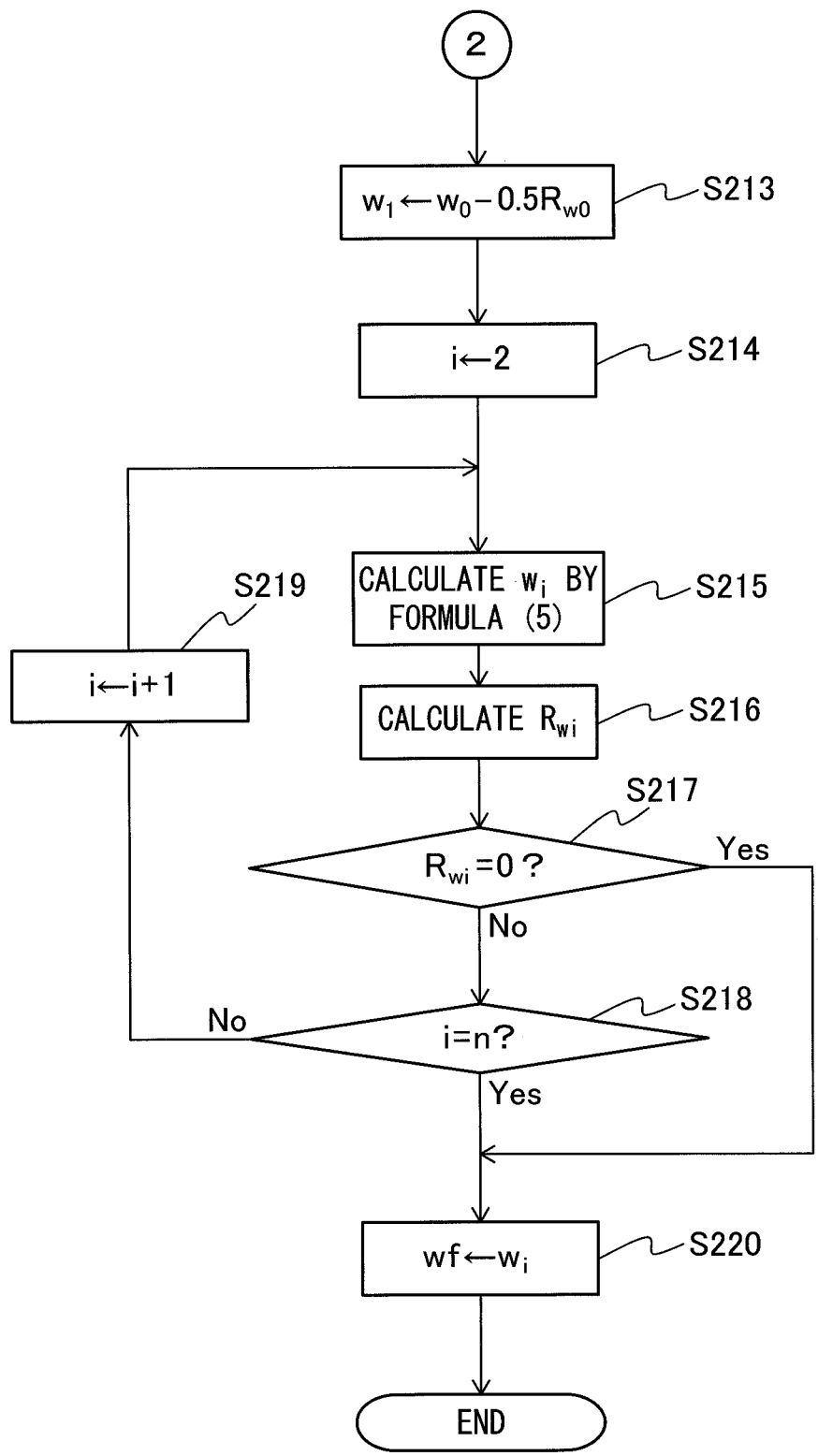
FIG. 14 is a flow chart showing a control routine of processing for deriving a target value in a second embodiment.

FIG. 12 to FIG. 14 show a flow chart showing a control routine of processing for deriving a target value in a second embodiment. The present control routine is executed by the plant control system.

First, at step S201, the provisional target value "r" is calculated based on the exogenous input "d". Next, at step S202, the value $R_r$ of the partial differential of the object function when the corrected target value "w" is the provisional target value "r" is calculated. Next, at step S203, the initial value $w_0$ of the corrected target value "w" is set to $r−0.5R_r$.

Next, at step S204, the value $R_{w0}$ of the partial differential of the object function when the corrected target value "w" is the initial value $w_0$ is calculated. Next, at step S205, it is judged whether the value $R_{w0}$ of the partial differential is negative. If it is judged that the value $R_{w0}$ of the partial differential is negative, the present control routine proceeds to step S206.

At step S206, the update number "i" is set to 1. Next, at step S207, the i-th corrected target value $w_i$ is calculated by the above formula (4).

Next, step S208, the value $R_{wi}$ of the partial differential of the object function when the corrected target value "w" is the i-th corrected target value $w_i$ is calculated. Next, at step S209, it is judged whether the value $R_{wi}$ of the partial differential is zero. If it is judged that the value $R_{wi}$ of the partial differential is not zero, the present control routine proceeds to step S210.

At step S210, it is judged whether the number of times "i" of updating is a predetermined value "n". The predetermined value "n" is an integer of 2 or more. If it is judged that the number of times "i" of updating is not the predetermined value "n", the present control routine proceeds to step S211. At step S211, the number of times "i" of updating is incremented by 1. After step S211, the present control routine returns to step S207.

On the other hand, if at step S209 it is judged that the value $R_{wi}$ of the partial differential is zero or if at step S210 it is judged that the number of times "i" of updating is the predetermined value "n", the present control routine proceeds to step S212. At step S212, the target value wf is set to the final corrected target value $w_i$. After step S212, the present control routine ends.

Further, if at step S205 it is judged that the value $R_{w0}$ of the partial differential is positive, the present control routine proceeds to step S213. At step S213, the first corrected target value $w_1$ is set to $w_0−0.5R_{w0}$.

Next, at step S214, the update number "i" is set to 2. Next, at step S215, the i-th corrected target value $w_i$ is calculated by the above formula (5). After that, step S216 to step S220 are performed in the same way as step S208 to step S212 of FIG. 13. Note that, the predetermined value "n" at step S218 may be different from the predetermined value "n" at step S210.

Third Embodiment

The configuration and control of the plant control system in the third embodiment are basically similar to the plant control system of the first embodiment except for the points explained below. For this reason, below, the third embodiment of the present invention will be explained focusing on the parts different from the first embodiment.

In the third embodiment, the reference governor 3 sets the initial value $w_0$ of the corrected target value "w" to a predetermined value between $r−0.5R_r$ and "r". "r" is a provisional target value, while $R_r$ is the value of the partial differential of the object function when the corrected target value "w" is the provisional target value "r". $R_r$ is obtained by entering "r" for "w" at the right side of the above formula (16).

FIG. 15 to FIG. 18 are views for explaining the method of updating the corrected target value in the third embodiment using graphs showing the partial differential of the object function. In the graphs of FIG. 15 to FIG. 18, the x-axis indicates the corrected target value "w", while the y-axis indicates the partial differential of the object function. FIG. 15 to FIG. 18 show the actual partial differential of the object function by one-dot chain lines. The corrected target value "w" when the partial differential of the object function becomes zero is the optimum target value $w_{op}$.

Figure 15:
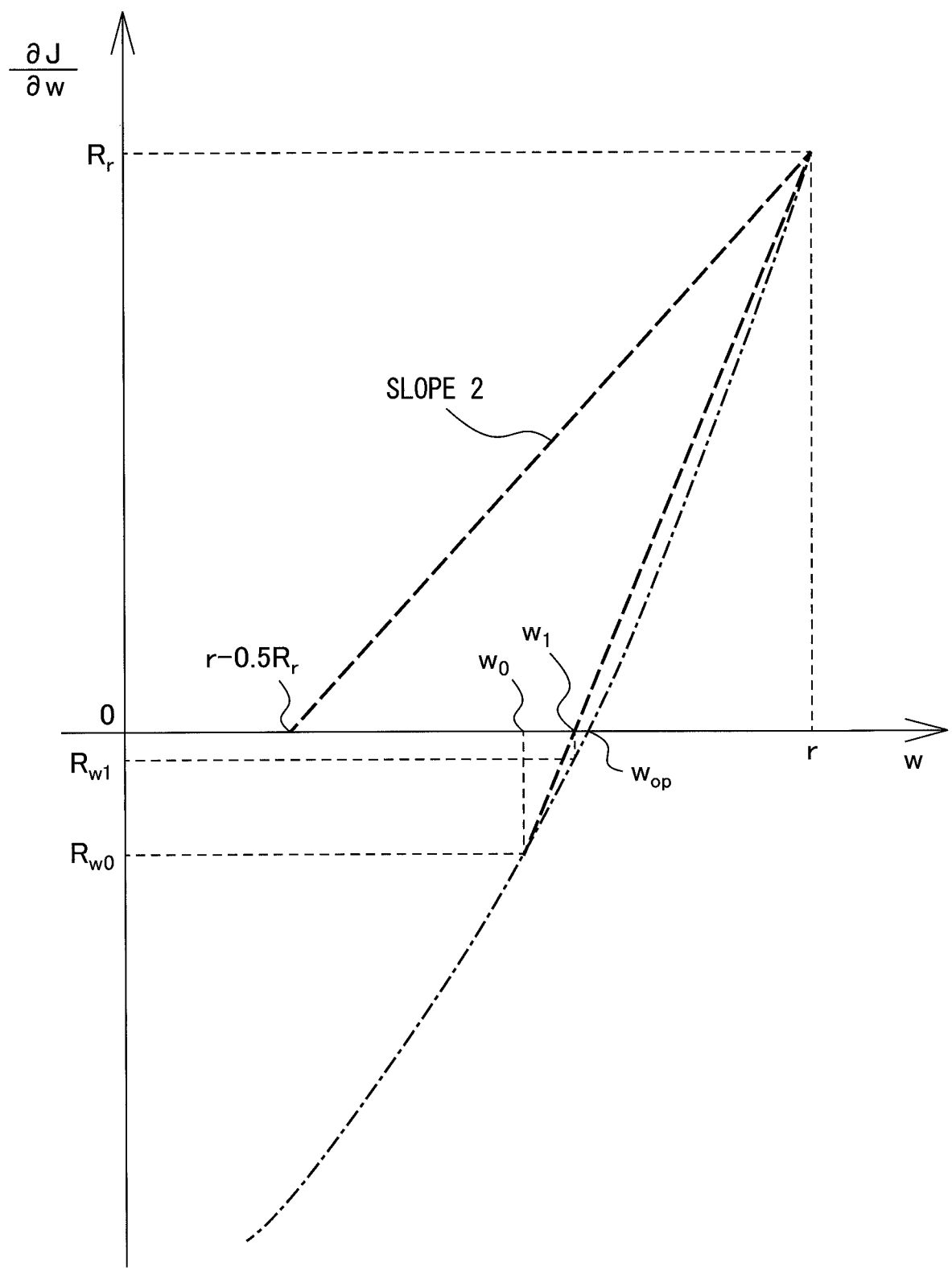
FIG. 15 is a view for explaining a method of updating a corrected target value in a third embodiment using a graph showing a partial differential for a corrected target value of an object function.

First, the example of FIG. 15 will be explained. In the example of FIG. 15, the value $R_r$ of the partial differential of the object function when the corrected target value "w" is the provisional target value "r" is positive. Further, the initial value $w_0$ of the corrected target value "w" is a value between $r-0.5R_r$ and "r", while the value $R_{w0}$ of the partial differential of the object function when the corrected target value "w" is the initial value $w_0$ is negative. The partial differential of the object function monotonously increases, so the optimum target value $w_{op}$ becomes a value larger than the initial value $w_0$. Note that, $R_{w0}$ is obtained by entering $w_0$ for "w" at the right side of the above formula (16).

In the example of FIG. 15, the reference governor 3 updates the corrected target value "w" by linear approximation. Specifically, the reference governor 3 sets the intersection of the line passing through the point $R_r$ and the point $R_{w0}$ and the x-axis to the first corrected target value $w_1$.

The first corrected target value $w_1$ is calculated by the following formula (20) derived from the following formula (19) utilizing the similarity of triangles.

$$(w_1-w_0):(r-w_1)=-R_{w0}:R_r \quad (19)$$

$$w_1=(R_{w0}r-R_rw_0)/(R_{w0}-R_r) \quad (20)$$

The second and later corrected target values are also similarly calculated. Therefore, the reference governor 3 calculates the i-th corrected target value $w_i$ by the following formula (4) if the value $R_r$ of the partial differential of the object function when the corrected target value "w" is the provisional target value "r" is positive and the value $R_{w0}$ of the partial differential of the object function when the corrected target value "w" is the initial value $w_0$ is negative.

$$w_i=(R_{wi-1}r-R_rw_{i-1})/(R_{wi-1}-R_r) \quad (4)$$

Here, $R_{wi-1}$ is the value of the partial differential of the object function when the corrected target value "w" is the i–1th corrected target value $w_{i-1}$, while the number of times "i" of updating is an integer of 1 or more. $R_{wi-1}$ is obtained by entering $w_{i-1}$ for "w" at the right side of the above formula (16).

Figure 16:
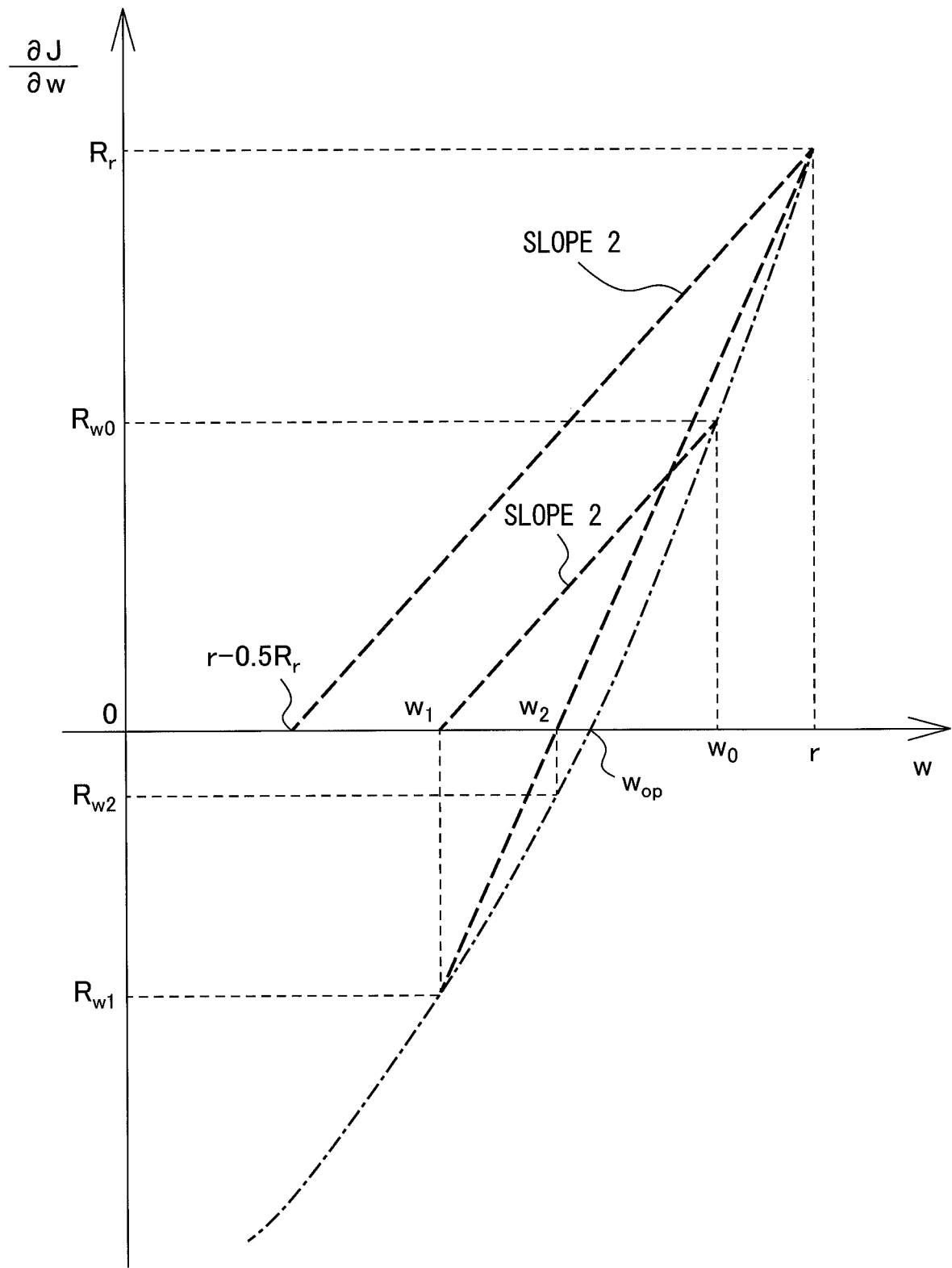
FIG. 16 is a view for explaining a method of updating a corrected target value in a third embodiment using a graph showing a partial differential for a corrected target value of an object function.

Next, the example of FIG. 16 will be explained. In the example of FIG. 16, the value $R_r$ of the partial differential of the object function when the corrected target value "w" is the provisional target value "r" is positive. Further, the initial value $w_0$ of the corrected target value "w" is a value between $r-0.5R_r$ and "r", and the value $R_{w0}$ of the partial differential of the object function when the corrected target value "w" is the initial value $w_0$ is positive.

In this case, the reference governor 3 sets the intersection ($w_0-0.5R_{w0}$) of the line of the slant 2 passing through the point $R_{w0}$ and the x-axis to the first corrected target value $w_1$. As a result, the value $R_{w1}$ of the partial differential of the object function when the corrected target value "w" is the first corrected target value $w_1$ becomes negative. The partial differential of the object function monotonously increases, so the optimum target value $w_{op}$ becomes a value larger than the first corrected target value $w_1$. Note that, $R_{w1}$ is obtained by entering $w_1$ for "w" of the right side of the above formula (16).

After that, the reference governor 3 updates the corrected target value "w" by linear approximation. Specifically, the reference governor 3 sets the intersection of the line passing through the point $R_r$ and the point $R_{w1}$ and the x-axis to the second corrected target value $w_2$. The second corrected target value $w_2$ is calculated by the following formula (22) derived from the following formula (21) utilizing the similarity of triangles.

$$(w_2-w_1):(r-w_2)=-R_{w1}:R_r \quad (21)$$

$$w_2=(R_{w1}r-R_rw_1)/(R_{w1}-R_r) \quad (22)$$

The third and later corrected target values are also similarly calculated. Therefore, the reference governor 3 sets the first corrected target value $w_1$ to $w_0-0.5R_{w0}$ and calculates the i-th corrected target value $w_i$ by the above formula (4) if the value $R_r$ of the partial differential of the object function when the corrected target value "w" is the provisional target value "r" is positive and the value $R_{w0}$ of the partial differential of the object function when the corrected target value "w" is the initial value $w_0$ is positive. In this case, the number of times "i" of updating is an integer of 2 or more.

Figure 17:
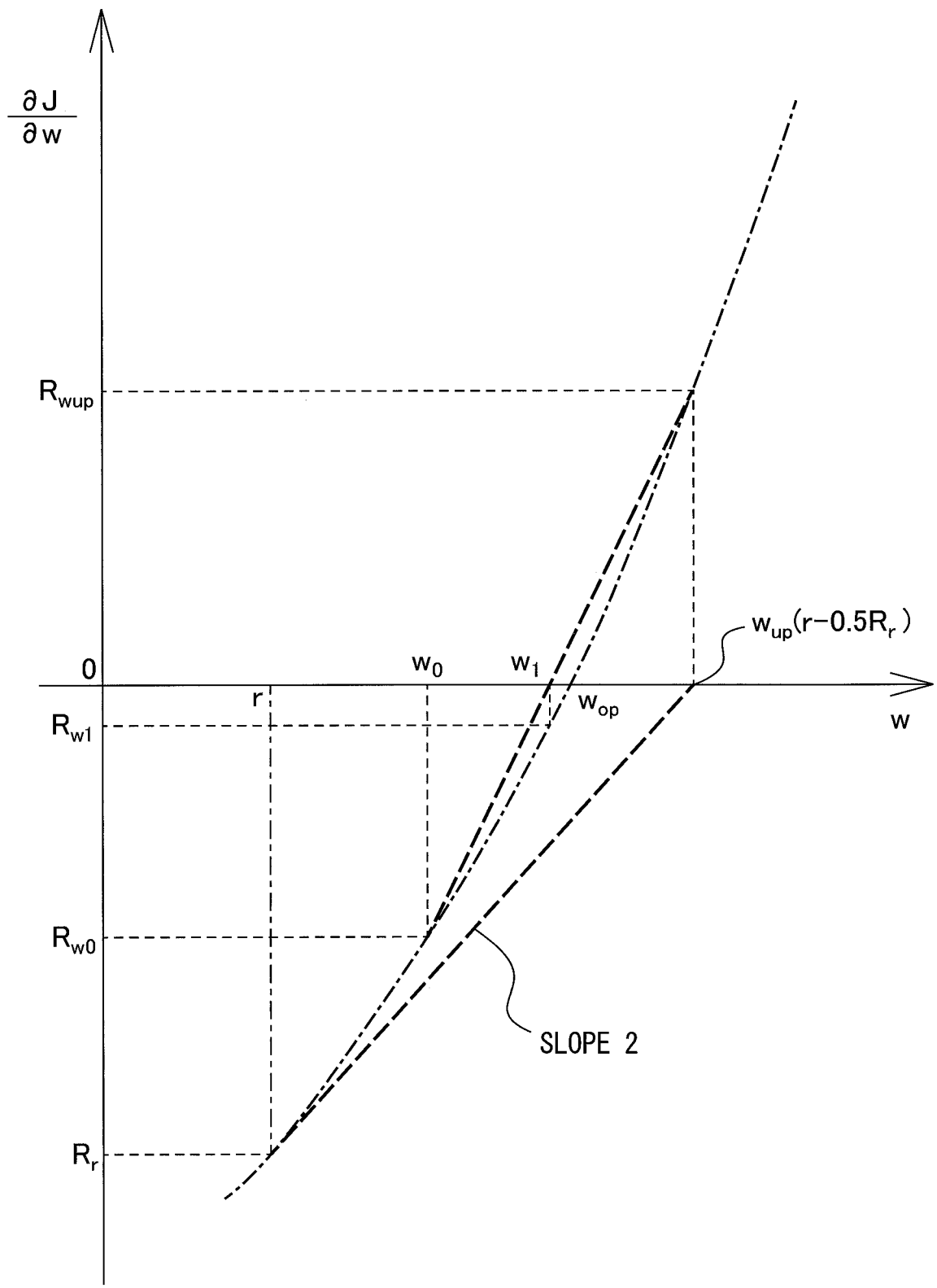
FIG. 17 is a view for explaining a method of updating a corrected target value in a third embodiment using a graph showing a partial differential for a corrected target value of an object function.

Next, the example of FIG. 17 will be explained. In the example of FIG. 17, the value $R_r$ of the partial differential of the object function when the corrected target value "w" is the provisional target value "r" is negative. Further, the initial value $w_0$ of the corrected target value "w" is a value between $r-0.5R_r$ and "r", and the value $R_{w0}$ of the partial differential of the object function when the corrected target value "w" is the initial value $w_0$ is negative. The partial differential of the object function monotonously increases, so the optimum target value $w_{op}$ becomes a value larger than the initial value $w_0$.

In the example of FIG. 17, the reference governor 3 updates the corrected target value "w" by linear approximation. Specifically, the reference governor 3 sets the intersection of the line passing through the point $R_{wup}$ and the point $R_{w0}$ and the x-axis to the first corrected target value $w_1$. The upper limit value $w_{up}$ of the range of search is $r-0.5R_r$, and $R_{wup}$ is the value of the partial differential of the object function when the corrected target value "w" is the upper limit value $w_{up}$.

The first corrected target value $w_1$ is calculated by the following formula (26) derived from the following formula (25) utilizing the similarity of triangles.

$$(w_1-w_0):(w_{up}-w_1)=-R_{w0}:R_{wup} \quad (25)$$

$$w_1=(R_{w0}w_{up}-R_{wup}w_0)/(R_{w0}-R_{wup}) \quad (26)$$

The second and later corrected target values are also similarly calculated. Therefore, the reference governor 3 calculates the i-th corrected target value $w_i$ by the following formula (6) if the value $R_r$ of the partial differential of the object function when the corrected target value "w" is the provisional target value "r" is negative and the value $R_{w0}$ of the partial differential of the object function when the corrected target value "w" is the initial value $w_0$ is negative.

$$w_i=(R_{wi-1}w_{up}-R_{wup}w_{i-1})/(R_{wi-1}-R_{wup}) \quad (6)$$

Here, $R_{wi-1}$ is the value of the partial differential of the object function when the corrected target value "w" is the i–1th corrected target value $w_{i-1}$, and the number of times "i" of updating is an integer of 1 or more. $R_{wi-1}$ is obtained by entering $w_{i-1}$ for "w" at the right side of the above formula (16).

Figure 18:
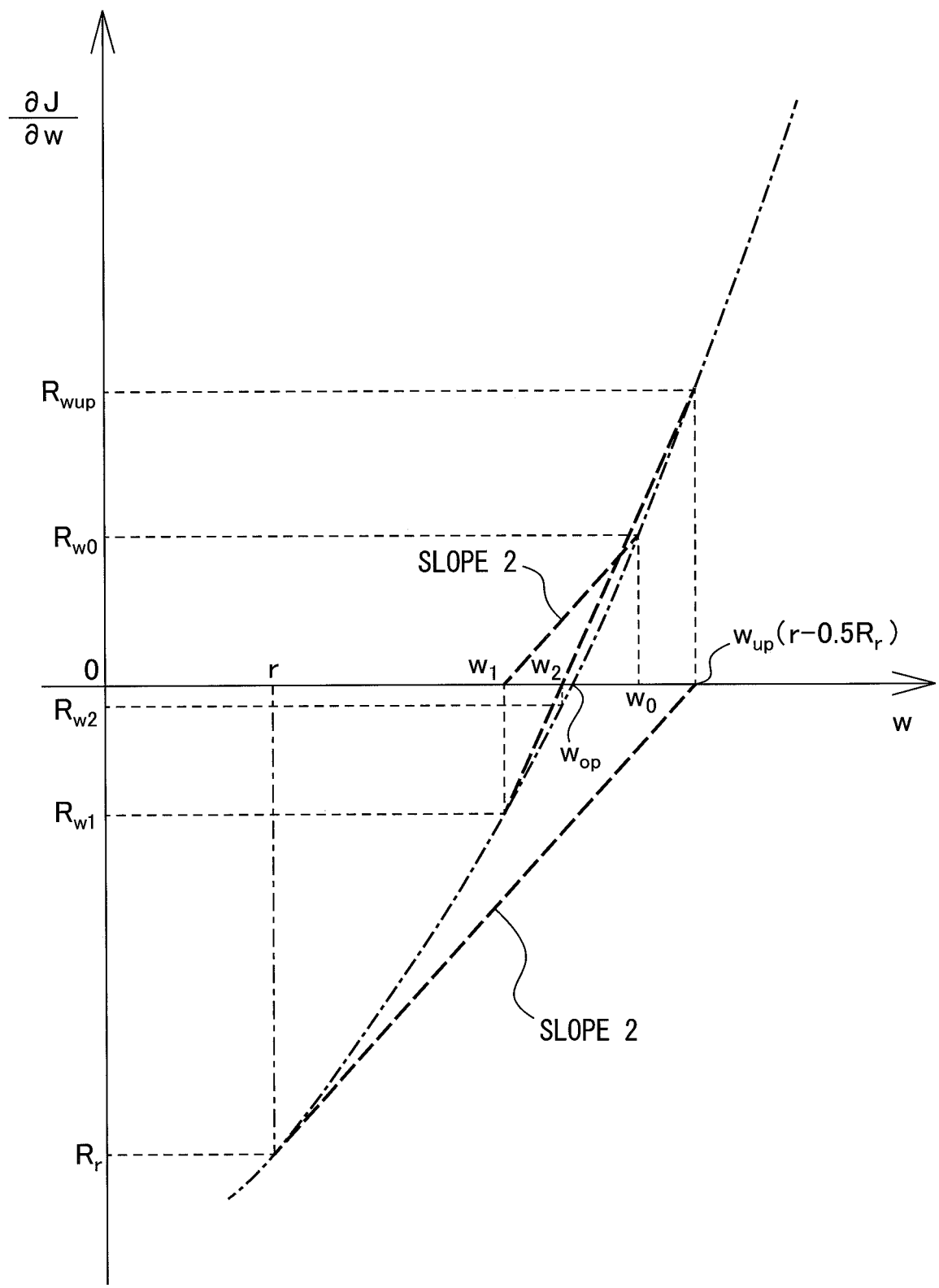
FIG. 18 is a view for explaining a method of updating a corrected target value in a third embodiment using a graph showing a partial differential for a corrected target value of an object function.

Next, the example of FIG. 18 will be explained. In the example of FIG. 18, the value $R_r$ of the partial differential of the object function when the corrected target value "w" is the provisional target value "r" is negative. Further, the initial value $w_0$ of the corrected target value "w" is a value between $r-0.5R_r$ and "r", and the value $R_{w0}$ of the partial differential of the object function when the corrected target value "w" is the initial value $w_0$ is positive.

In this case, the reference governor 3 sets the intersection $(w_0-0.5R_{w0})$ of the line of the slant 2 passing through the point $R_{w0}$ and the x-axis to the first corrected target value $w_1$. As a result, the value $R_{w1}$ of the partial differential of the object function when the corrected target value "w" is the first corrected target value $w_1$ becomes negative. The partial differential of the object function monotonously increases, so the optimum target value $w_{op}$ becomes a value larger than the first corrected target value $w_1$. Note that, $R_{w1}$ is obtained by entering $w_1$ for "w" at the right side of the formula (16).

After that, the reference governor 3 updates the corrected target value "w" by linear approximation. Specifically, the reference governor 3 sets the intersection of the line passing through the point $R_{wup}$ and the point $R_{w1}$ and the x-axis to the second corrected target value $w_2$. The second corrected target value $w_2$ is calculated by the following formula (28) derived from the following formula (27) utilizing the similarity of triangles.

$$(w_2-w_1):(w_{up}-w_2)=-R_{w1}:R_{wup} \qquad (27)$$

$$w_2=(R_{w1}w_{up}-R_{wup}w_1)/(R_{w1}-R_{wup}) \qquad (28)$$

The third and later corrected target values are also similarly calculated. Therefore, the reference governor 3 sets the first corrected target value $w_1$ to $w_0-0.5R_{w0}$ and calculates the i-th corrected target value $w_i$ by the above formula (6) if the value $R_r$ of the partial differential of the object function when the corrected target value "w" is the provisional target value "r" is negative and the value $R_{w0}$ of the partial differential of the object function when the corrected target value "w" is the initial value $w_0$ is positive. In this case, the number of times "i" of updating is an integer of 2 or more.

Further, in the same way as the first embodiment, the reference governor 3 ends the updating of the corrected target value "w" and sets the final corrected target value $w_i$ to the target value wf when the value of the partial differential of the object function corresponding to the corrected target value "w" becomes zero or when the number of times of updating the corrected target value "w" reaches a predetermined value.

By updating the corrected target value "w" by linear approximation in the above way, it is possible to make the corrected target value "w" effectively approach the optimum corrected target value $w_{op}$. Therefore, it is possible to reduce the processing load of the reference governor 3 much more.

<Processing for Deriving Target Value>

Figure 19:
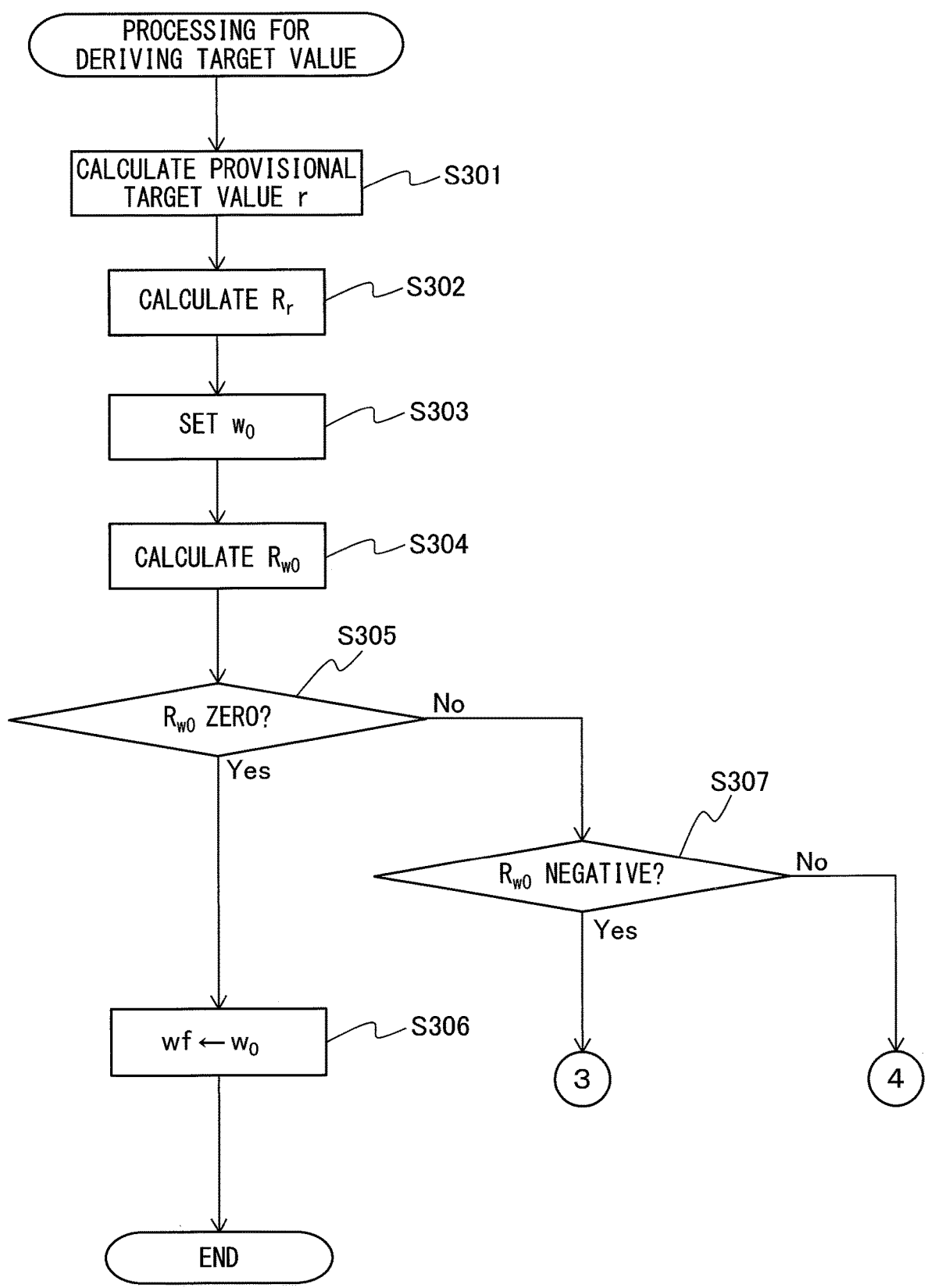
FIG. 19 is a flow chart showing a control routine of processing for deriving a target value in a third embodiment.
Figure 20:
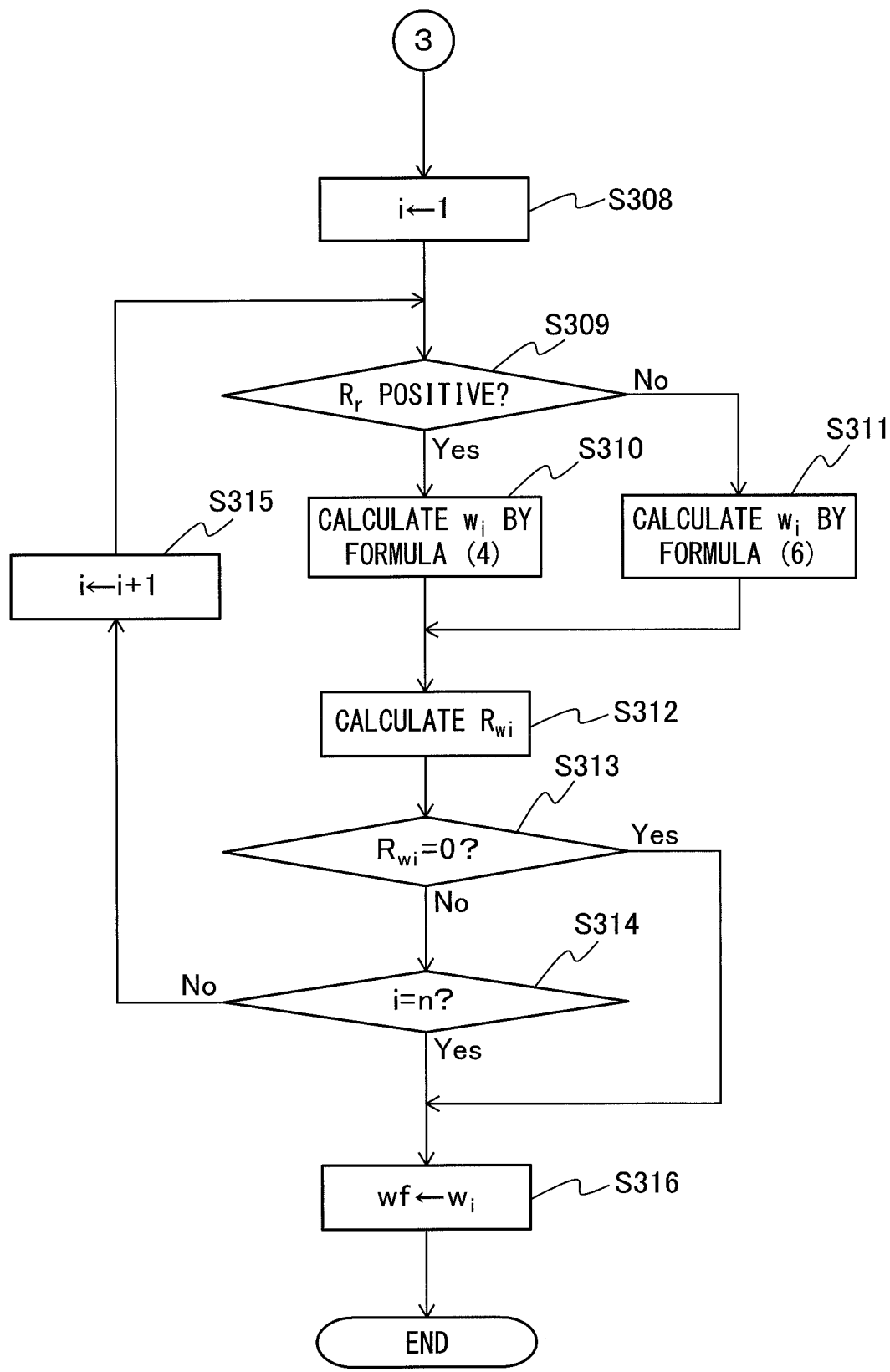
FIG. 20 is a flow chart showing a control routine of processing for deriving a target value in a third embodiment.
Figure 21:
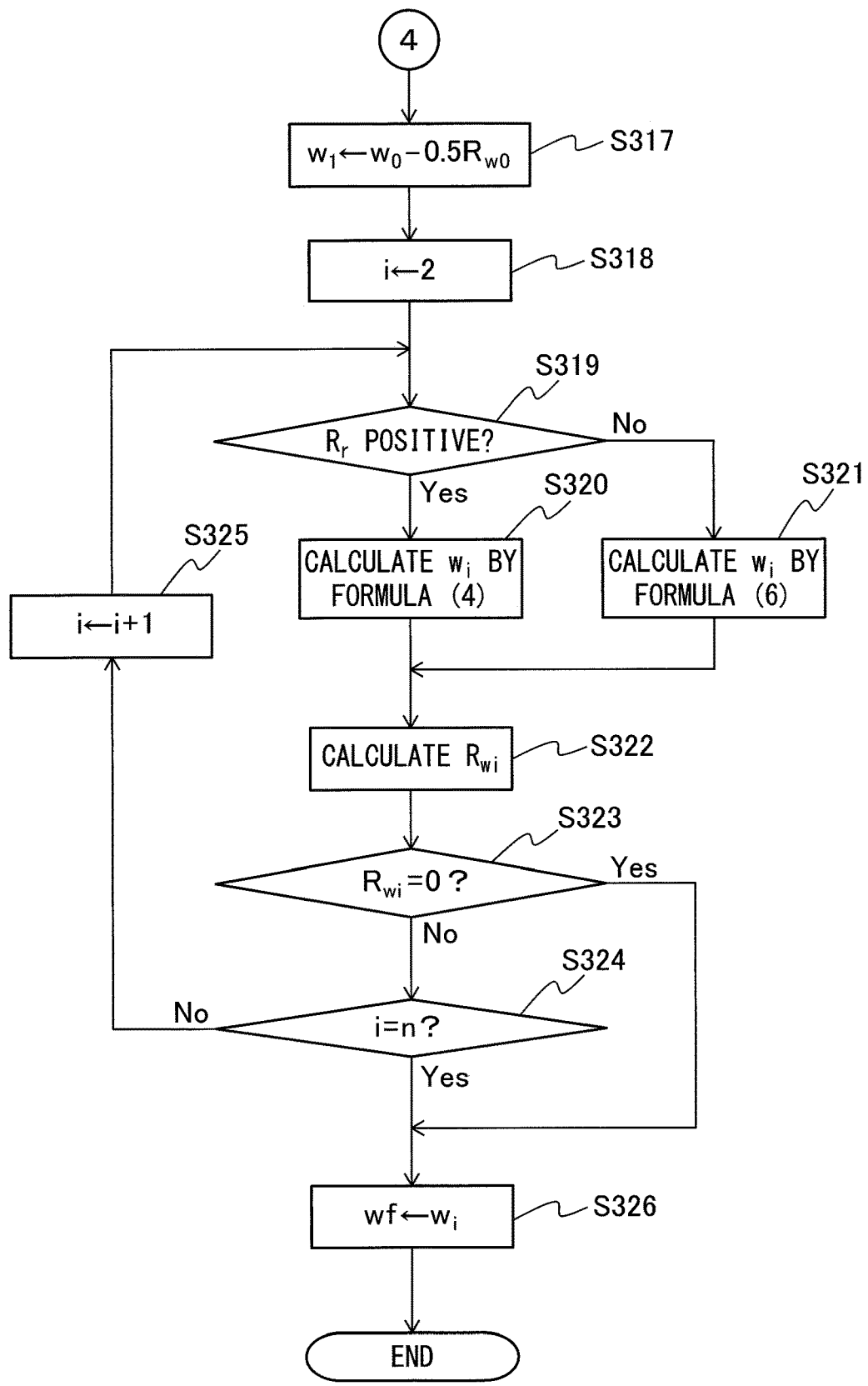
FIG. 21 is a flow chart showing a control routine of processing for deriving a target value in a third embodiment.

FIG. 19 to FIG. 21 show a flow chart showing a control routine of processing for deriving a target value in the third embodiment. The present control routine is executed by the plant control system.

First, at step S301, the provisional target value "r" is calculated based on the exogenous input "d". Next, at step S302, the value $R_r$ of the partial differential of the object function when the corrected target value "w" is the provisional target value "r" is calculated.

Next, at step S303, the initial value $w_0$ of the corrected target value "w" is set to a predetermined value between $r-0.5R_r$ and "r". For example, if the value $R_r$ of the partial differential is positive, the initial value $w_0$ of the corrected target value "w" is set to $r-0.5R_r+0.5R_rC$, while if the value $R_r$ of the partial differential is negative, the initial value $w_0$ of the corrected target value "w" is set to $r-0.5R_rD$. $r-0.5R_r$ is the lower limit value of the range of search when the value $R_r$ of the partial differential is positive, and $0.5R_r$ is the length of the range of search when the value $R_r$ of the partial differential is positive. "r" is the lower limit value of the range of search when the value $R_r$ of the partial differential is negative, and $-0.5R_r$ is the length of the range of search when the value $R_r$ of the partial differential is negative. C and D are predetermined and are numbers between 0 and 1.

Next, at step S304, the value $R_{w0}$ of the partial differential of the object function when the corrected target value "w" is the initial value $w_0$ is calculated. Next, at step S305, it is judged whether the value $R_{w0}$ of the partial differential is zero. If it is judged that the value $R_{w0}$ of the partial differential is zero, the present control routine proceeds to step S306. At step S306, the target value wf is set to the initial value $w_0$. After step S306, the present control routine ends.

On the other hand, if at step S305 it is judged that the value $R_{w0}$ of the partial differential is not zero, the present control routine proceeds to step S307. At step S307, it is judged whether the value $R_{w0}$ of the partial differential is negative. If it is judged that the value $R_{w0}$ of the partial differential is negative, the present control routine proceeds to step S308.

At step S308, the update number "i" is set to 1. Next, at step S309, it is judged whether the value $R_r$ of the partial differential is positive. If it is judged that the value $R_r$ of the partial differential is positive, the present control routine proceeds to step S310. At step S310, the i-th corrected target value $w_i$ is calculated by the above formula (4).

On the other hand, if at step S309 it is judged that the value $R_r$ of the partial differential is negative, the present control routine proceeds to step S311. At step S311, the i-th corrected target value $w_i$ is calculated by the above formula (6).

After step S310 or step S311, the present control routine proceeds to step S312. At step S312, the value $R_{wi}$ of the partial differential of the object function when the corrected target value "w" is the i-th corrected target value $w_i$ is calculated. Next, at step S313, it is judged whether the value $R_{wi}$ of the partial differential is zero. If it is judged that the value $R_{wi}$ of the partial differential is not zero, the present control routine proceeds to step S314.

At step S314, it is judged whether the number of times "i" of updating is a predetermined value "n". The predetermined value "n" is an integer of 2 or more. If it is judged that the number of times "i" of updating is not the predetermined value "n", the present control routine proceeds to step S315. At step S315, the number of times "i" of updating is incremented by 1. After step S315, the present control routine returns to step S309.

On the other hand, if at step S313 it is judged that the value $R_{wi}$ of the partial differential is zero or if at step S314 it is judged that the number of times "i" of updating is the predetermined value "n", the present control routine proceeds to step S316. At step S316, the target value wf is set to the final corrected target value $w_i$. After step S316, the present control routine ends.

Further, if at step S307 it is judged that the value $R_{w0}$ of the partial differential is positive, the present control routine proceeds to step S317. At step S317, the first corrected target value $w_1$ is set to $w_0-0.5R_{w0}$.

Next, at step S318, the update number "i" is set to 2. Next, at step S319, it is judged whether the value $R_r$ of the partial differential is positive. If it is judged that the value $R_r$ of the partial differential is positive, the present control routine proceeds to step S320. At step S320, the i-th corrected target value $w_i$ is calculated by the above formula (4).

On the other hand, if at step S319 it is judged that the value $R_r$ of the partial differential is negative, the present control routine proceeds to step S321. At step S321, the i-th corrected target value $w_i$ is calculated by the above formula (6).

After step S320 or step S321, the present control routine proceeds to step S322. After that, step S322 to step S326 are performed in the same way as step S312 to step S316 of FIG. 20. Note that, the predetermined value "n" at step S324 may differ from the predetermined value "n" at step S314.

Other Embodiments

Above, preferred embodiments according to the present invention were explained, but the present invention is not limited to these embodiments and can be modified and changed in various ways within the language of the claims.

For example, if the control output "y" has the lower limit value $y_{low}$, the object function J(w) is defined by the following formula (2).

[Mathematical Equation 11]

$$J(w) = (r-w)^2 + \rho \sum_{k=1}^{N} \max\{y_{low} - y_k, 0\} \quad (2)$$

In this case, the penalty function (second term on the right side of formula (2)) expressing the degree of satisfaction of the constraint condition relating to the control output "y" is configured so that when the future predicted value $y_k$ of the control output "y" is below the lower limit value $y_{low}$, the difference between the lower limit value $y_{low}$ and the future predicted value $y_k$ is given as a penalty to the object function J(w). For this reason, the value of the object function J(w) becomes smaller the smaller the amount by which the future predicted value $y_k$ of the control output "y" falls below the lower limit value $y_{low}$.

Further, if making $\max\{y_{low}-y_k, 0\} = f_2(y_k)$, the above formula (2) becomes the following formula (29).

[Mathematical Equation 12]

$$J(w) = (r-w)^2 + \rho \sum_{k=1}^{N} f_2(y_k) \quad (29)$$

Further, the slant of the object function J(w) is expressed by the following formula (30) as the partial differential for the corrected target value "w" of the object function J(w).

[Mathematical Equation 13]

$$\frac{\partial J}{\partial w} = 2(w-r) + \rho \sum_{k=1}^{N} \frac{\partial f_2}{\partial y_k} \frac{\partial y_k}{\partial w} \quad (30)$$

Figure 22:
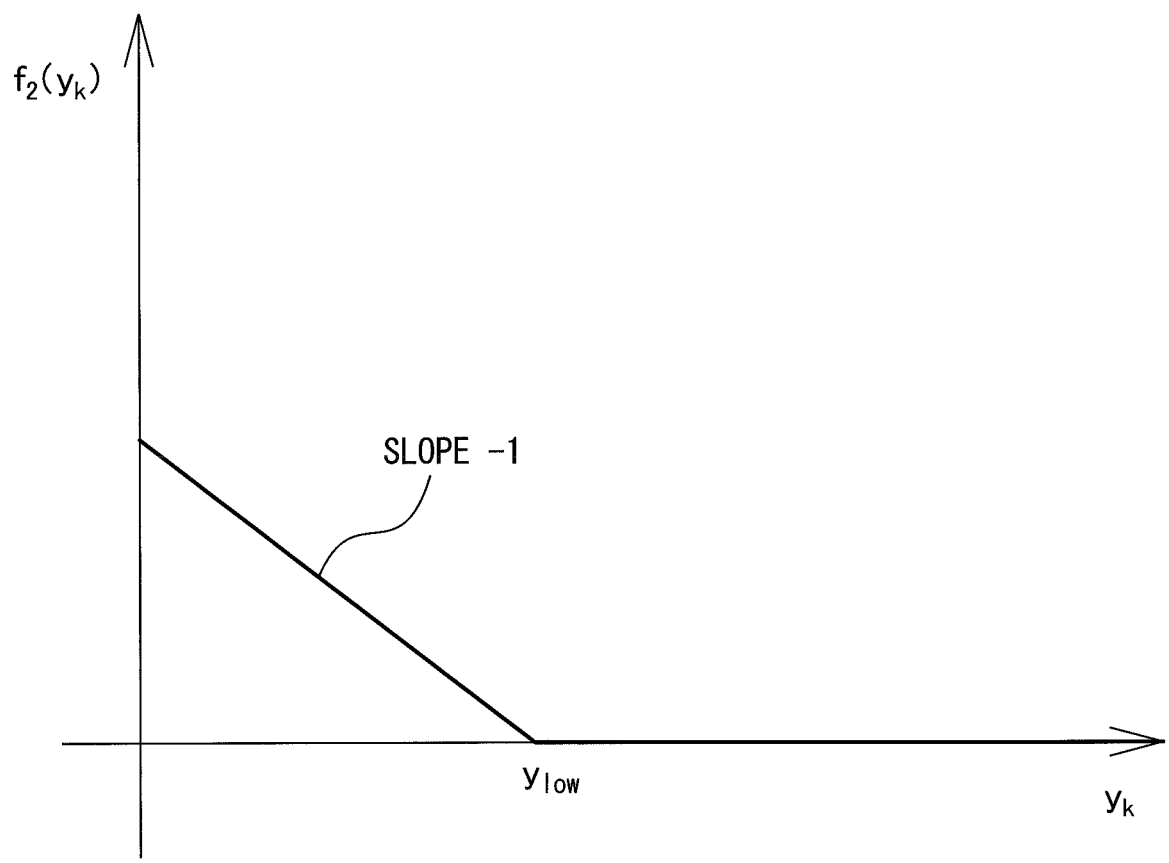
FIG. 22 is a graph showing a second function.
Figure 23:
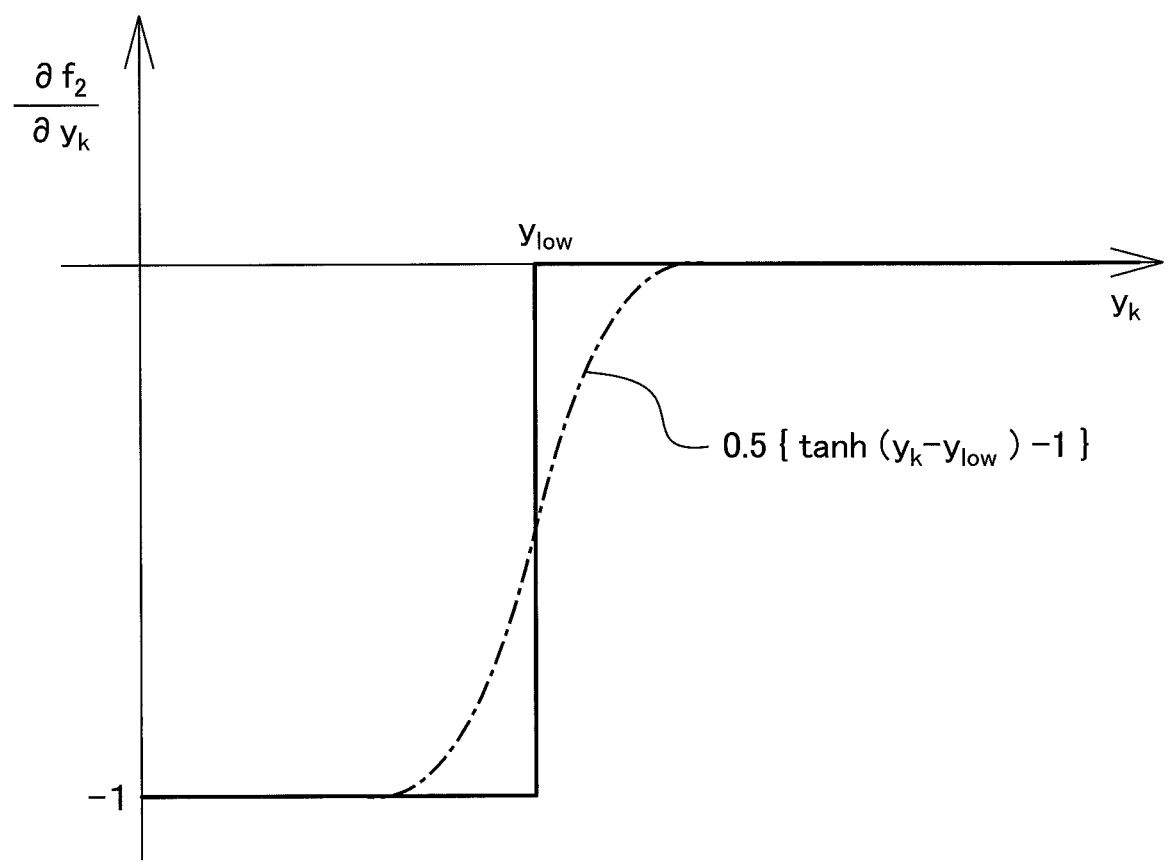
FIG. 23 is a graph showing a partial differential for a future predicted value of control output of a second function.

FIG. 22 is a graph showing the second function $f_2(y_k)$. In the graph of FIG. 22, the x-axis indicates the future predicted value $y_k$ of the control output "y", while the y-axis expresses the second function $f_2(y_k)$. FIG. 23 is a graph showing the partial differential for the future predicted value $y_k$ of the second function $f_2(y_k)$. In the graph of FIG. 23, the x-axis indicates the future predicted value $y_k$ of the control output "y", while the y-axis expresses the partial differential for the future predicted value $y_k$ of the second function $f_2(y_k)$.

As shown in FIG. 23, the partial differential of the future predicted value $y_k$ of the second function $f_2(y_k)$ becomes a discontinuous step function. Here, this step function is approximated by a continuous function such as shown in the following formula (31).

[Mathematical Equation 14]

$$\frac{\partial f_2}{\partial y_k} \approx 0.5\{\tanh(y_k - y_{low}) - 1\} \quad (31)$$

The curve expressed by the formula (31) is shown by a one-dot chain line in FIG. 23.

Further, the partial differential of the corrected target value "w" of the future predicted value $y_k$ becomes the following formula (14).

[Mathematical Equation 15]

$$\frac{\partial y_k}{\partial w} = (A^{k-1} + A^{k-2} + \ldots + 1)B \quad (14)$$

If making $(A^{k-1}+A^{k-2}+ \ldots +1)B = P_k$ and making $A^k y_0 - y_{low} = s_k$, the following formula (32) is obtained.

$$y_k - y_{low} = (A^k y_0 - y_{low}) + P_k w = s_k + P_k w \quad (32)$$

From the above formulas (30), (31), (14), and (32), the following formula (33) is obtained.

[Mathematical Equation 16]

$$\frac{\partial J}{\partial w} = 2(w-r) + \rho \sum_{k=1}^{N} 0.5\{\tanh(P_k w + s_k) - 1\}P_k \quad (33)$$

The second order partial differential of the object function becomes the following formula (34) by utilizing the following formula (17).

[Mathematical Equation 17]

$$(\tanh x)' = \frac{4}{(e^x + e^{-x})^2} = \frac{1}{\cosh^2 x} \quad (17)$$

[Mathematical Equation 18]

$$\frac{\partial^2 J}{\partial w^2} = 2 + \rho \sum_{k=1}^{N} 0.5 \frac{P_k^2}{\cosh^2(P_k w + s_k)} \quad (34)$$

The second term on the right side of the above formula (34) always becomes zero or more. For this reason, the value of the second order partial differential of the object function always becomes 2 or more.

Therefore, the partial differential of the object function increases monotonously by a slant of 2 or more. For this reason, even if the object function J(w) is defined by the above formula (2), a method similar to the case where the object function J(w) is defined by the above formula (1) can be used to perform the minimum value search of the object function.

Further, if updating the corrected target value "w" by linear approximation, the value of the partial differential of the object function corresponding to the updated corrected target value "w" can become a positive value. For example, if like in the second embodiment the initial value $w_0$ of the corrected target value "w" is set to $r-0.5R_r$, sometimes the value $R_{wi}$ of the partial differential of the object function corresponding to the first corrected target value $w_1$ calculated by linear approximation becomes a positive value.

Figure 24:
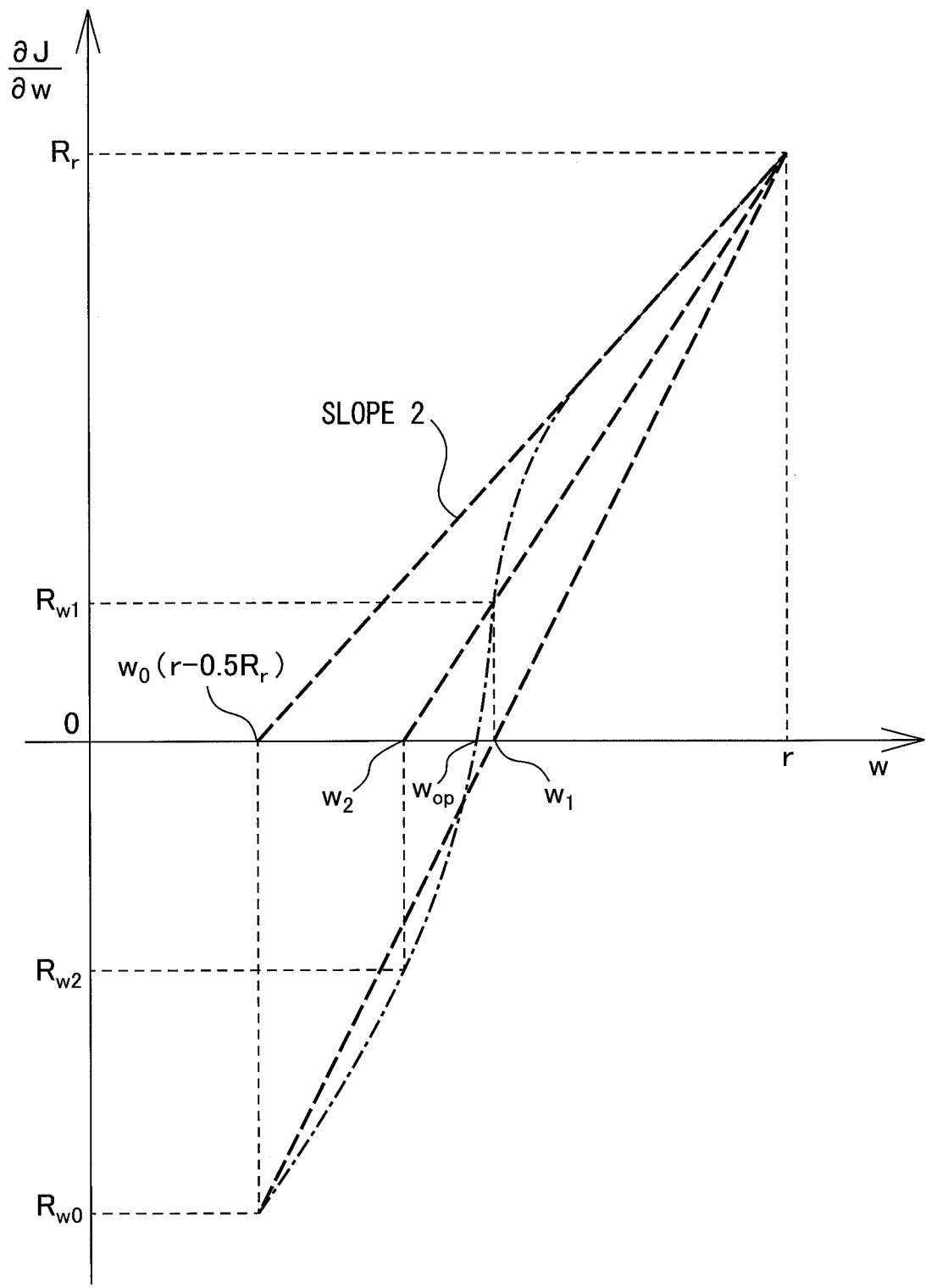
FIG. 24 is a view for explaining a method of updating a corrected target value in a second embodiment using a graph showing a partial differential for a corrected target value of an object function.

FIG. 24 is a view for explaining the method of updating the corrected target value in the second embodiment using a graph showing the partial differential for the corrected target value of the object function. In the graph of FIG. 24, the x-axis indicates the corrected target value "w", while the y-axis indicates the partial differential of the object function. FIG. 24 shows an actual partial differential of an object function by a one-dot chain line. The corrected target value "w" when the partial differential of the object function becomes zero is the optimum target value $w_{op}$. In the example of FIG. 24, the locus of the partial differential of the object function differs from the example of FIG. 9.

Figure 25:
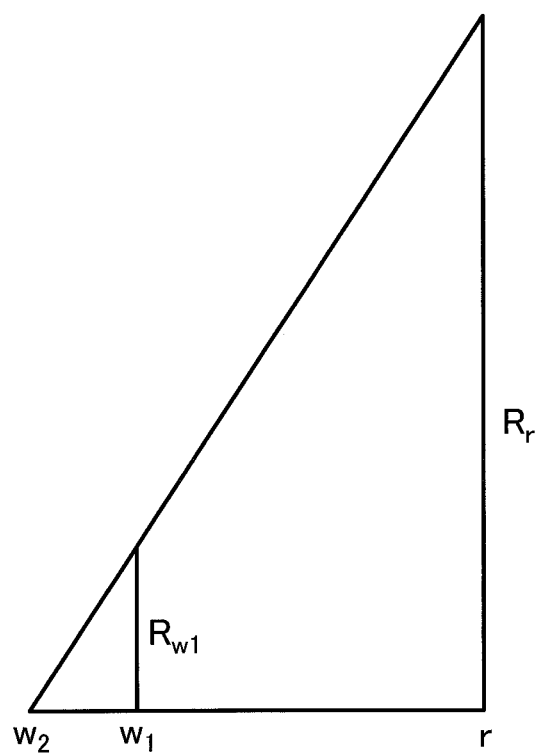
FIG. 25 is a view showing the similarity of triangles utilized for updating the corrected target value.
Figure 26:
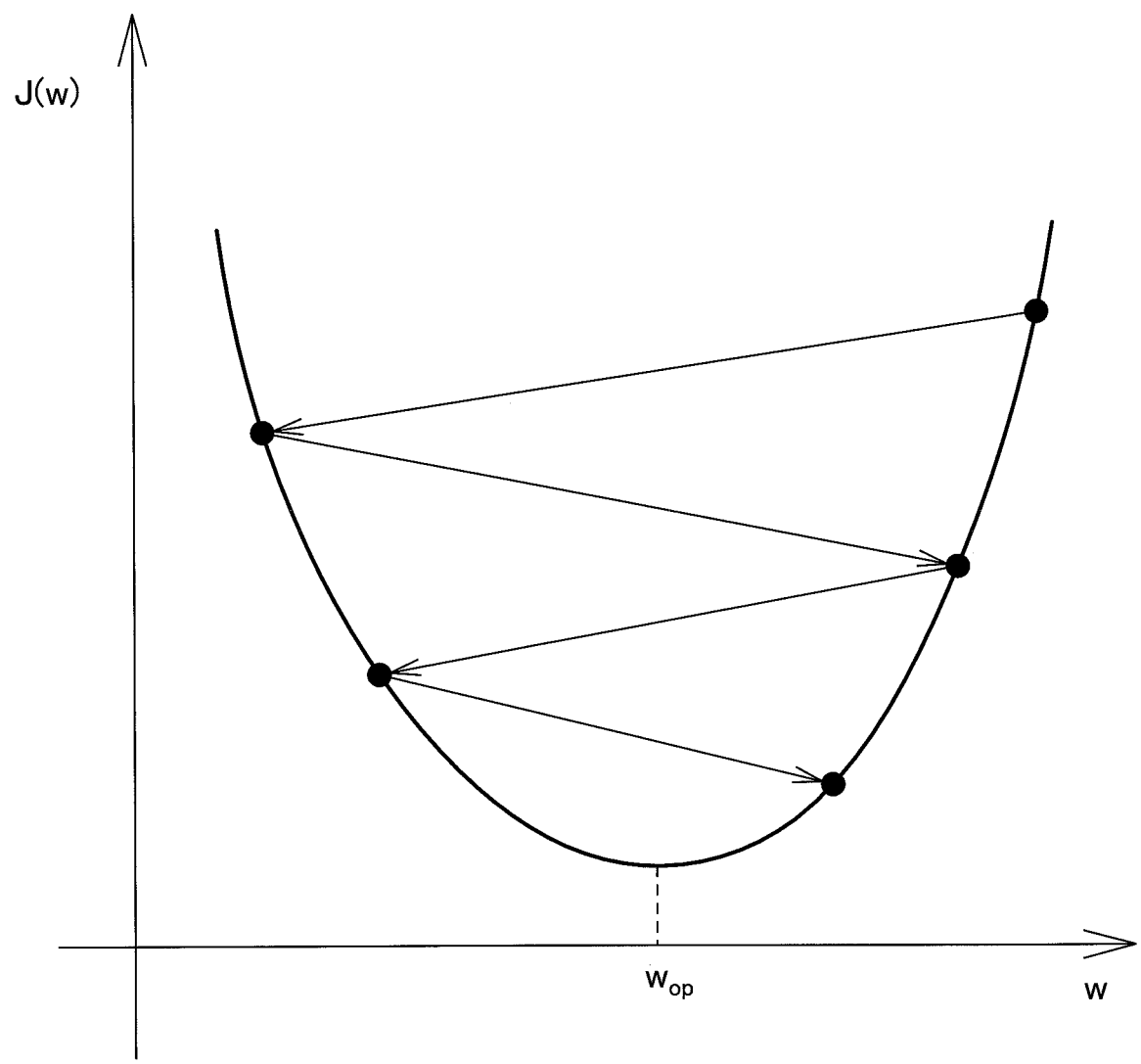
FIG. 26 is a view showing a minimum value search of an object function in the prior art.
Figure 27:
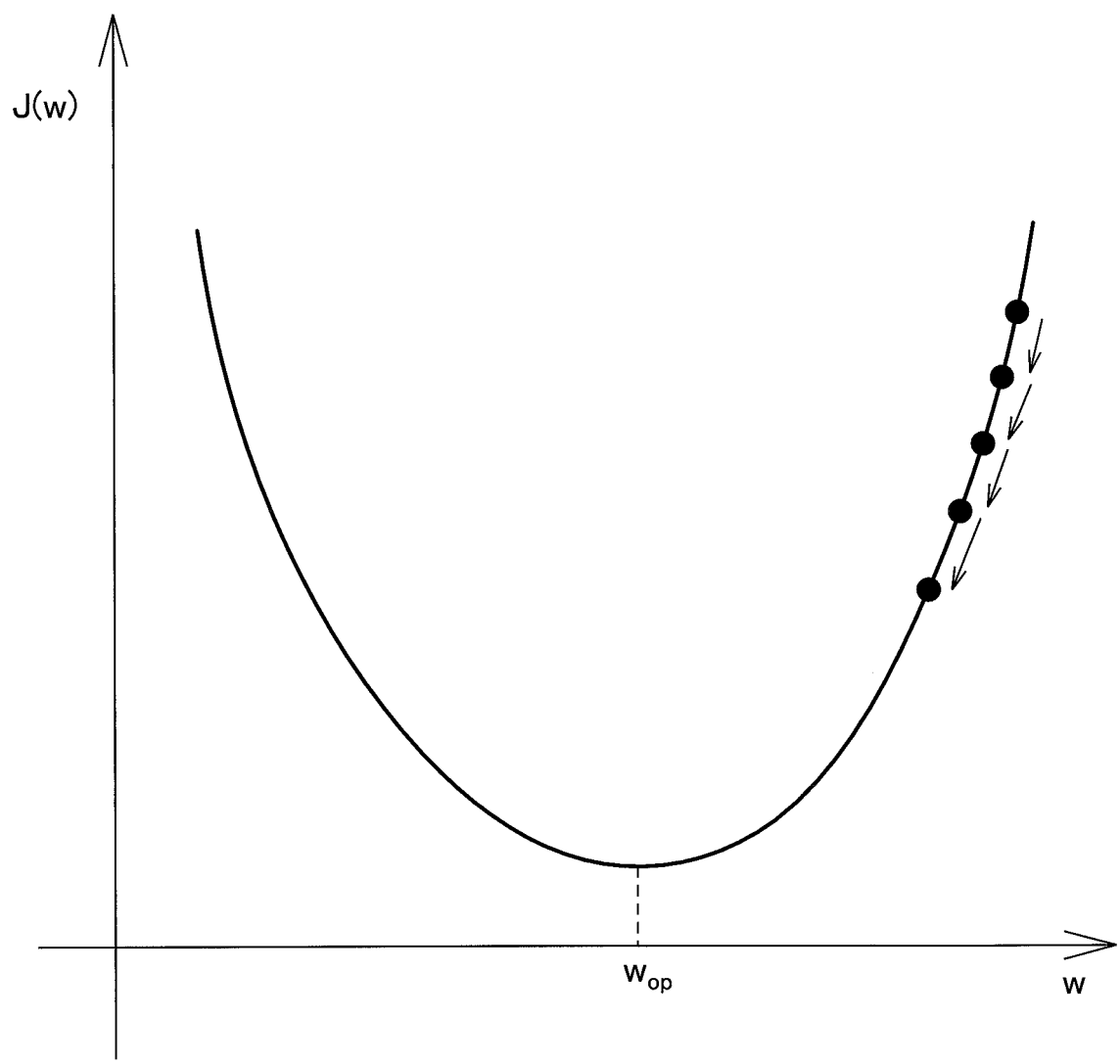
FIG. 27 is a view showing a minimum value search of an object function in the prior art.

In the example of FIG. 24, the value $R_{w1}$ of the partial differential of the object function corresponding to the first corrected target value $w_1$, which is the intersection of the line passing through the point $R_r$ and the point $R_{w0}$ and the x-axis, is a positive value. In this case as well, in the same way as the example of FIG. 9, the reference governor 3 sets the intersection of the line passing through the point $R_r$ and the point $R_{w1}$ and the x-axis to the second corrected target value $w_2$. The second corrected target value $w_2$ is calculated by the following formula (36) derived from the following formula (35) utilizing the similarity of triangles such as shown in FIG. 25.

$$(w_1-w_2):(r-w_2)=R_{w1}:R_r \quad (35)$$

$$w_2=(R_{w1}r-R_r w_1)/(R_{w1}-R_r) \quad (36)$$

The formula (36) is the same as the above formula (22) relating to the example of FIG. 9. Therefore, regardless of the locus of the partial differential of the object function, if updating the corrected target value "w" by linear approximation, the i-th corrected target value $w_i$ can be calculated by the above formula (4).

Further, the plant control system in the embodiment can be applied to all sorts of plants where the future predicted value of one control output having the constraint condition can be estimated. For example, the plant is an intake/exhaust system of a diesel engine, while the control output is the supercharging pressure. In this case, the exogenous input "d" is the engine speed and fuel injection amount, and the control input "u" is the opening degree of a variable nozzle provided at a turbine of a turbocharger.

Further, the plant may be the EGR system of a diesel engine and the control output may be an EGR rate. Further, the plant may be an actuator (for example, a variable nozzle, EGR valve, throttle valve, etc.,) and the control output may be the opening degree of the actuator. Further, the plant may be a common rail system and the control output may be the rail pressure. Further, the plant may be a system or actuator of an internal combustion engine other than a diesel engine such as a gasoline engine, a vehicle, a machine tool, etc.

REFERENCE SIGNS LIST 2 provisional target value calculating part
3 reference governor
5 feedback controller
6 plant

The invention claimed is:

1. A plant control system comprising:
a controller configured to:
determine a control input of a plant so that one control output of the plant approaches a target value;
calculate a provisional target value based on a predetermined parameter of the plant;
perform a minimum value search of an object function by updating a corrected target value to thereby derive the target value from the provisional target value, wherein the object function is defined by at least one of the following two equations:

$$J(w) = (r-w)^2 + \rho \sum_{k=1}^{N} \max\{y_k - y_{up}, 0\}$$

$$J(w) = (r-w)^2 + \rho \sum_{k=1}^{N} \max\{y_{low} - y_k, 0\}$$

where "r" is the provisional target value, "w" is the corrected target value, p is a weighting coefficient, "k" is a time step, $y_k$ is a future predicted value of the control output at the time step k, $y_{up}$ is an upper limit value of the control output, $y_{low}$ is a lower limit value of the control output, and N is a number of prediction steps;
calculate the future predicted value of the control output by the following formula:

$$y_{k+1}=Ay_k+Bw,$$

where A and B are predetermined constants; and
update the corrected target value only between $r-0.5R_r$ and "r", where $R_r$ is a value of a partial differential for the corrected target value "w" of the object function when the corrected target value "w" is the provisional target value "r".

2. The plant control system according to claim 1, wherein the controller is configured to update the corrected target value by a binary search method.

3. The plant control system according to claim 1, wherein the controller is configured to set an initial value $w_0$ of the corrected target value to $r-0.5R_r$.

4. The plant control system according to claim 3, wherein if a value $R_{w0}$ of the partial differential when the corrected target value "w" is the initial value $w_0$ is negative, the controller is configured to calculate an i-th corrected target value wi by the following formula:

$$w_i=(R_{wi-1}r-R_r w_{i-1})/(R_{wi-1}-R_r)$$

where $R_{wi-1}$ is a value of the partial differential when the corrected target value "w" is an i−1th corrected target value $w_{i-1}$ and "i" is an integer of 1 or more.

5. The plant control system according to claim 3, wherein if a value $R_{w0}$ of the partial differential when the corrected target value "w" is the initial value $w_0$ is positive, the controller is configured to set a 1st corrected target value $w_1$ to $w_0-0.5R_{w0}$ and calculate an i-th corrected target value $w_i$ by the following formula:

$$w_i=(R_{wi-1}w_0-R_{w0}w_{i-1})/(R_{wi-1}-R_{w0})$$

where $R_{wi-1}$ is a value of the partial differential when the corrected target value "w" is an i−1th corrected target value $w_{i-1}$ and "i" is an integer of 2 or more.

6. The plant control system according to claim 1, wherein the controller is configured to set the initial value $w_0$ of the corrected target value to a predetermined value between $r-0.5R_r$ and "r".

7. The plant control system according to claim 6, wherein if a value $R_r$ of the partial differential when the corrected target value "w" is the provisional target value "r" is positive and a value $R_{w0}$ of the partial differential when the corrected target value "w" is the initial value $w_0$ is negative, the controller is configured to calculate an i-th corrected target value $w_i$ by the following formula:

$$w_i = (R_{wi-1}r - R_r w_{i-1})/(R_{wi-1} - R_r)$$

where $R_{wi-1}$ is a value of the partial differential when the corrected target value "w" is an i–1th corrected target value $w_{i-1}$ and "i" is an integer of 1 or more.

8. The plant control system according to claim 6, wherein if a value $R_r$ of the partial differential when the corrected target value "w" is the provisional target value "r" is positive and a value $R_{w0}$ of the partial differential when the corrected target value "w" is the initial value $w_0$ is positive, the controller is configured to set a 1st corrected target value $w_1$ to $w_0 - 0.5R_{w0}$ and calculate an i-th corrected target value $w_i$ by the following formula:

$$w_i = (R_{wi-1}r - R_r w_{i-1})/(R_{wi-1} - R_r)$$

where $R_{wi-1}$ is a value of the partial differential when the corrected target value "w" is an i–1th corrected target value $w_{i-1}$ and "i" is an integer of 2 or more.

9. The plant control system according to claim 6, wherein if a value $R_r$ of the partial differential when the corrected target value "w" is the provisional target value "r" is negative and a value $R_{w0}$ of the partial differential when the corrected target value "w" is the initial value $w_0$ is negative, the controller is configured to calculate an i-th corrected target value $w_i$ by the following formula:

$$w_i = (R_{wi-1}w_{up} - R_{wup}w_{i-1})/(R_{wi-1} - R_{wup})$$

where an upper limit value $w_{up}$ of the search range is $r-0.5R_r$, $R_{wup}$ is a value of the partial differential when the corrected target value "w" is the upper limit value $w_{up}$, $R_{wi-1}$ is a value of the partial differential when the corrected target value "w" is an i–1th corrected target value $w_{i-1}$, and "i" is an integer of 1 or more.

10. The plant control system according to claim 6, wherein if a value $R_r$ of the partial differential when the corrected target value "w" is the provisional target value "r" is negative and a value $R_{w0}$ of the partial differential when the corrected target value "w" is the initial value $w_0$ is positive, the controller is configured to set a 1st corrected target value $w_1$ to $w_0 - 0.5Rw_0$ and calculate an i-th corrected target value $w_i$ by the following formula:

$$w_i = (R_{wi-1}w_{up} - R_{wup}w_{i-1})/(R_{wi-1} - R_{wup})$$

where an upper limit value $w_{up}$ of the search range is $r-0.5R_r$, $R_{wup}$ is a value of the partial differential when the corrected target value "w" is the upper limit value $w_{up}$, $R_{wi-1}$ is a value of the partial differential when the corrected target value "w" is an i–1th corrected target value $w_{i-1}$ and "i" is an integer of 2 or more.

* * * * *